United States Patent
Salemme et al.

(12) 
(10) Patent No.: US 8,609,069 B2
(45) Date of Patent: Dec. 17, 2013

(54) REBAUDIOSIDE C AND ITS STEREOISOMERS AS NATURAL PRODUCT SWEETNESS ENHANCERS

(75) Inventors: F. Raymond Salemme, Yardley, PA (US); Daniel Long, Philadelphia, PA (US); Roy Kyle Palmer, Cranbury, NJ (US); Francis Xavier Brennan, Philadelphia, PA (US); Dennis Sprous, Ware, MA (US)

(73) Assignee: Redpoint Bio Corporation, Ewing, NJ (US)

( * ) Notice: Subject to any disclaimer, the term of this patent is extended or adjusted under 35 U.S.C. 154(b) by 404 days.

(21) Appl. No.: 12/782,673

(22) Filed: May 18, 2010

(65) Prior Publication Data

US 2011/0070172 A1    Mar. 24, 2011

Related U.S. Application Data

(60) Provisional application No. 61/179,330, filed on May 18, 2009, provisional application No. 61/226,679, filed on Jul. 17, 2009.

(51) Int. Cl.
*A23L 1/236*    (2006.01)
*A61K 8/60*    (2006.01)
*A61K 47/26*    (2006.01)
*A61Q 11/00*    (2006.01)

(52) U.S. Cl.
USPC .......................................................... 424/49

(58) Field of Classification Search
USPC .......................................................... 424/49
See application file for complete search history.

(56) References Cited

U.S. PATENT DOCUMENTS 4,612,942 A * 9/1986 Dobberstein et al. ......... 131/276
2008/0108710 A1 * 5/2008 Prakash et al. ................ 514/783

FOREIGN PATENT DOCUMENTS

CA       2185496       3/1998

OTHER PUBLICATIONS

Schiffman et al. "Investigation of Synergism in Binary Mixtures of Sweeteners" Brain Research Bulletin 1995 38(2):105-120.

* cited by examiner

*Primary Examiner* — Jeffrey S. Lundgren
*Assistant Examiner* — Zenab Olabowale
(74) *Attorney, Agent, or Firm* — Licata & Tyrell, P.C.

(57) ABSTRACT

The present invention is directed to the use of rebaudioside C, or a stereoisomer thereof, for enhancing the sweet taste of carbohydrate sweeteners, such as sucrose and fructose. The present invention is also directed to consumables comprising a combination of a carbohydrate sweetener and rebaudioside C, or a stereoisomer thereof.

6 Claims, 16 Drawing Sheets

Taste Profiling References

Taste profiling solutions, corresponding to the 0 to 8 scale, used in the training were as follows:

Intensity Rating

| | 2 | 4 | 6 | 8 |
|---|---|---|---|---|
| Sucrose (Sweet) | 2.5% | 5% | 7.5% | 10% |
| Sodium Chloride (Salt) | 0.5% | 1% | 1.5% | 2% |
| Citric Acid (Sour) | 0.095% | 0.19% | 0.38% | 0.56% |
| Salicin (Bitter) | 0.0143% | 0.0286% | 0.0429% | 0.0572% |
| Anise extract (Liquorice) | 0.05% | 0.1% | 0.15% | 0.2% |

Water is a zero on the scale for all flavors

FIG. 8

REBAUDIOSIDE C AND ITS STEREOISOMERS AS NATURAL PRODUCT SWEETNESS ENHANCERS

FIELD OF THE INVENTION

The present invention relates to sweeteners. In particular, the present invention relates to the use of rebaudioside C, or a stereoisomer thereof, for enhancing the sweet taste of carbohydrate sweeteners, such as sucrose and fructose. The present invention is also directed to consumables comprising a combination of rebaudioside C, or a stereoisomer thereof, and a carbohydrate sweetener.

BACKGROUND OF THE INVENTION

The sweet diterpene glycosides of *Stevia* have been characterized, and eight sweet glycosides of steviol have been identified. These glycosides accumulate in *Stevia* leaves where they may attain from 10 to 20% of the leaf weight. On a dry weight basis, a typical profile for the four major glycosides found in the leaves of *Stevia* includes 0.3% dulcoside, 0.6% rebaudioside C, 3.8% rebaudioside A and 9.1% stevioside. Other glycosides identified within *Stevia* include rebaudiosides B, D, and E, and dulcosides A and B. Out of the four major diterpene glycoside sweeteners present in *Stevia* leaves only two (stevioside and rebaudioside A) have physical and sensory properties that are well characterized. Stevioside is known to be 110 to 270 times sweeter than sucrose, rebaudioside A 150 to 320 times sweeter than sucrose, and rebaudioside C 40 to 60 times sweeter than sucrose.

Of the diterpene glycosides found in *Stevia* extracts, rebaudioside A is known to have the least aftertaste. This aftertaste is described by many as bitter and licorice-like, and is present in all current *Stevia* extracts.

Rebaudioside A has been tested in mixtures with other sweeteners, such as fructose, glucose and sucrose, at sweetness intensities equivalent to 3% (w/v-%), 5% (w/v-%) and 7% (w/v-%) sucrose to determine the presence and degree of synergism in these mixtures (Schiffmann et al., *Brain Research Bulletin* 38:105-120 (1995)). According to the results, rebaudioside A appears to have an additive effect in mixtures with fructose and glucose, but a synergistic effect in mixtures with sucrose at sweetness intensities equivalent to 3% (w/v-%) sucrose. At sweetness intensities equivalent to 5% (w/v-%), rebaudioside A had an additive effect in mixtures with fructose, glucose and sucrose. At sweetness intensities equivalent to 7% (w/v-%) sucrose, rebaudioside A had an additive effect with a mixture with sucrose, but a suppressive effect with mixtures with glucose and fructose. In fact, no sweetener combinations were synergistic at sweetness intensities equivalent with the 7% (w/v-%) sucrose level.

U.S. Pat. No. 4,612,942 mentions that diterpene glycosides can modify or enhance flavor characteristics, such as sweet, when the amount of diterpene glycoside added is less than the sweetness threshold level of the diterpene glycoside in the orally consumable composition. However, no consumable composition containing only rebaudioside C as a diterpene glycoside for enhancing sweet flavor is described nor how the sweetness intensity of the consumable composition plays a role in the sweetness enhancing effect of a diterpene glycoside, and especially of rebaudioside C.

A need exists for more potent sweet taste enhancers that can effectively enhance the sweet taste of a carbohydrate sweetener without exhibiting an off-taste, such as a bitter aftertaste. In particular, a need exists in the art for a method of enhancing the sweetness of consumables that are very sweet, i.e., that have a sweetness intensity equivalent to from about 5% (w/v-%) to about 12% (w/v-%) sucrose.

BRIEF SUMMARY OF THE INVENTION

The present invention is related to the use of rebaudioside C, and stereoisomers thereof, for enhancing the sweet taste of carbohydrate sweeteners, such as sucrose and fructose.

One aspect of the present invention is to provide a method of enhancing a sweet taste of a carbohydrate sweetener. This method comprises administering to a subject the carbohydrate sweetener and an effective amount of rebaudioside C, or a stereoisomer thereof, wherein the effective amount provides a sweet taste enhancing effect without exhibiting any off-taste. Preferably, the carbohydrate sweetener is sucrose, fructose, or glucose. In one embodiment, the carbohydrate sweetener and rebaudioside C, or a stereoisomer thereof, are administered in a consumable. The consumable includes, but is not limited to, a food product, a dietary supplement, a nutraceutical, a pharmaceutical composition, a dental hygienic composition or a cosmetic product. In one embodiment, rebaudioside C, or a stereoisomer thereof, is present in the consumable at a concentration of from about 100 ppm to about 600 ppm (from about 105 µM to about 630 µM). In one embodiment, rebaudioside C, or a stereoisomer thereof, is present in the consumable at a concentration of from about 150 µM to about 600 µM. In one embodiment, rebaudioside C, or a stereoisomer thereof, is present in the consumable at a concentration of from about 150 µM to about 350 µM. In one embodiment, rebaudioside C, or a stereoisomer thereof, is present in the consumable at a concentration of from about 350 µM to about 600 µM. In one embodiment, rebaudioside C, or a stereoisomer thereof, is present in the consumable at a concentration of from about 250 µM to about 350 µM, and preferably about 250 µM or about 300 µM. In one embodiment, the carbohydrate sweetener is present in the consumable of the present invention at a concentration of from about 20000 ppm to about 100000 ppm. In one embodiment, the sweetness intensity of the consumable is equivalent to about 5-12% (w/v-%) sucrose solution. In one embodiment, the sweetness intensity of the consumable is equivalent to about 5-7% (w/v-%) sucrose solution. In another embodiment, the sweetness intensity of the consumable is equivalent to about 8-12% (w/v-%) sucrose solution. In one embodiment, the sweetness intensity of the consumable is equivalent to about 5% (w/v-%), about 6% (w/v-%), about 7% (w/v-%), or about 8% (w/v-%) sucrose solution. In one embodiment, the sweetness intensity of the consumable is equivalent to about 9% (w/v-%), about 10% (w/v-%), about 11% (w/v-%), or about 12% (w/v-%) sucrose solution.

One aspect of the present invention is to provide a consumable, comprising a carbohydrate sweetener and rebaudioside C, or a stereoisomer thereof, in an amount effective to enhance the sweet taste of the carbohydrate sweetener without exhibiting an off-taste. In one embodiment, rebaudioside C, or a stereoisomer thereof, is present in the consumable at a concentration of from about 100 ppm to about 600 ppm (from about 105 µM to about 630 µM). In one embodiment, the consumable of the present invention contains from about 150 µM to about 600 µM rebaudioside C, or a stereoisomer thereof. In one embodiment, the consumable of the present invention contains from about 150 µM to about 350 µM, from about 250 µM to about 350 µM, and preferably about 250 µM or about 300 µM, rebaudioside C, or a stereoisomer thereof. In one embodiment, the consumable of the present invention contains from about 350 µM to about 600 µM rebaudioside C, or a stereoisomer thereof. In one embodiment, the carbohydrate sweetener is present in the consumable of the present invention at a concentration of from about 20000 ppm to about 100000 ppm. In one embodiment, the consumable has a sweetness intensity equivalent to about 5-12% (w/v-%) sucrose solution. In one embodiment, the consumable has a sweetness intensity equivalent to about 5-7% (w/v-%) sucrose solution. In another embodiment, the consumable has a sweetness intensity equivalent to about 8-12% (w/v-%) sucrose solution. In one embodiment, the sweetness intensity of the consumable of the present invention is equivalent to about 5% (w/v-%), about 6% (w/v-%), about 7% (w/v-%), about 8% (w/v-%), about 9% (w/v-%), about 10% (w/v-%), about 11% (w/v-%), or about 12% (w/v-%) sucrose solution.

Another aspect of the present invention is to provide a method of decreasing the amount of a carbohydrate sweetener in a consumable, comprising adding rebaudioside C, or a stereoisomer thereof, to the consumable and thereby reducing the amount of the carbohydrate sweetener needed to exhibit a given level of sweetness.

Another aspect of the present invention is to provide a method of enhancing the sweetness of a consumable comprising a carbohydrate sweetener, comprising adding rebaudioside C, or a stereoisomer thereof, to the consumable in an amount effective to enhance the sweetness of the consumable. In one embodiment, the consumable has a sweetness intensity equivalent to about 5-12% (w/v-%) sucrose solution. In one embodiment, the consumable has a sweetness intensity equivalent to about 5% (w/v-%), about 6% (w/v-%), about 7% (w/v-%), or about 8% (w/v-%) sucrose solution. In one embodiment, the consumable has a sweetness intensity equivalent to about 9% (w/v-%), about 10% (w/v-%), about 11% (w/v-%), or about 12% (w/v-%) sucrose solution.

In one embodiment, rebaudioside C, or a stereoisomer thereof, is added to the consumable in an amount to obtain a concentration of from about 100 ppm to about 600 ppm (from about 105 µM to about 630 µM). In one embodiment, rebaudioside C, or a stereoisomer thereof, is added to the consumable in an amount to obtain a concentration of from about 150 µM to about 600 µM.

In one aspect, the present invention provides a tabletop sweetener composition, comprising (i) at least one carbohydrate sweetener, (ii) rebaudioside C, or a stereoisomer thereof, and (iii) optionally a bulking agent. Rebaudioside C, or a stereoisomer thereof, is present in an amount effective to synergistically enhance the sweetness of the carbohydrate sweetener.

In one aspect, the present invention provides a tabletop sweetener composition consisting essentially of (i) at least one carbohydrate sweetener, (ii) rebaudioside C, or a stereoisomer thereof, and (iii) optionally a bulking agent, wherein rebaudioside C, or a stereoisomer thereof, is present in an amount effective to synergistically enhance the sweetness of the carbohydrate sweetener.

In one aspect, the present invention provides a method of making a tabletop sweetener composition, comprising including (i) at least one carbohydrate sweetener, (ii) rebaudioside C, or a stereoisomer thereof, and (iii) optionally a bulking agent. In one embodiment, rebaudioside C, or a stereoisomer thereof, is included in an amount effective to synergistically enhance the sweetness of the carbohydrate sweetener. In one embodiment, rebaudioside C, or a stereoisomer thereof, is included in an amount of from about 100 ppm to about 600 ppm.

In one aspect, the present invention provides a method of making a consumable, comprising adding (i) at least one carbohydrate sweetener, and (ii) rebaudioside C, or a stereoisomer thereof, wherein rebaudioside C, or a stereoisomer thereof, is added in an amount effective to synergistically enhance the sweetness of the carbohydrate sweetener. In one embodiment, the carbohydrate sweetener is sucrose. In one embodiment, rebaudioside C, or a stereoisomer thereof, is included in an amount of from about 100 ppm to about 600 ppm. In one embodiment, the consumable is a food or beverage product. In one embodiment, the consumable is a beverage product having an acid component, wherein said acid component is citric acid.

Additional embodiments and advantages of the invention will be set forth in part of the description that follows, and will flow from the description, or may be learned by practice of the invention. The embodiments and advantages of the invention will be realized and attained by means of the elements and combinations particularly pointed out in the appended claims.

It is to be understood that both the foregoing summary and the following detailed description are exemplary and explanatory only and are not restrictive of the invention, as claimed.

BRIEF DESCRIPTION OF THE DRAWINGS/FIGURES

FIG. 8 provides the taste profiling references used in the tastings.

Figure 9:
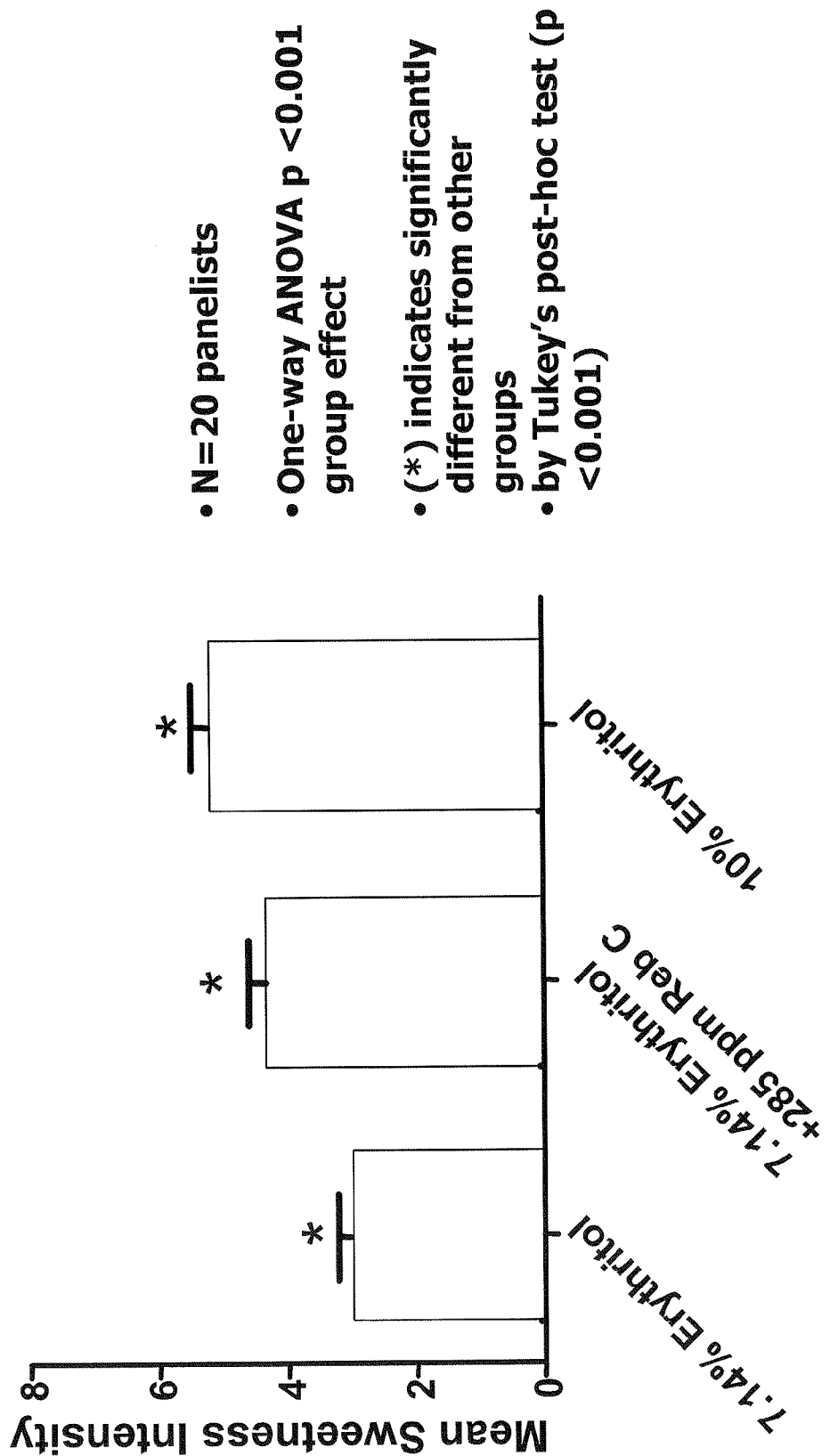

FIG. 9 depicts graphically the results of Example 9 illustrating the sweetness enhancing effect of 285 ppm (300 µM) rebaudioside C on 7.14% (w/v-%) erythritol solution having a sweetness intensity equivalent to 5% (w/v-%) sucrose solution.

Figure 10:
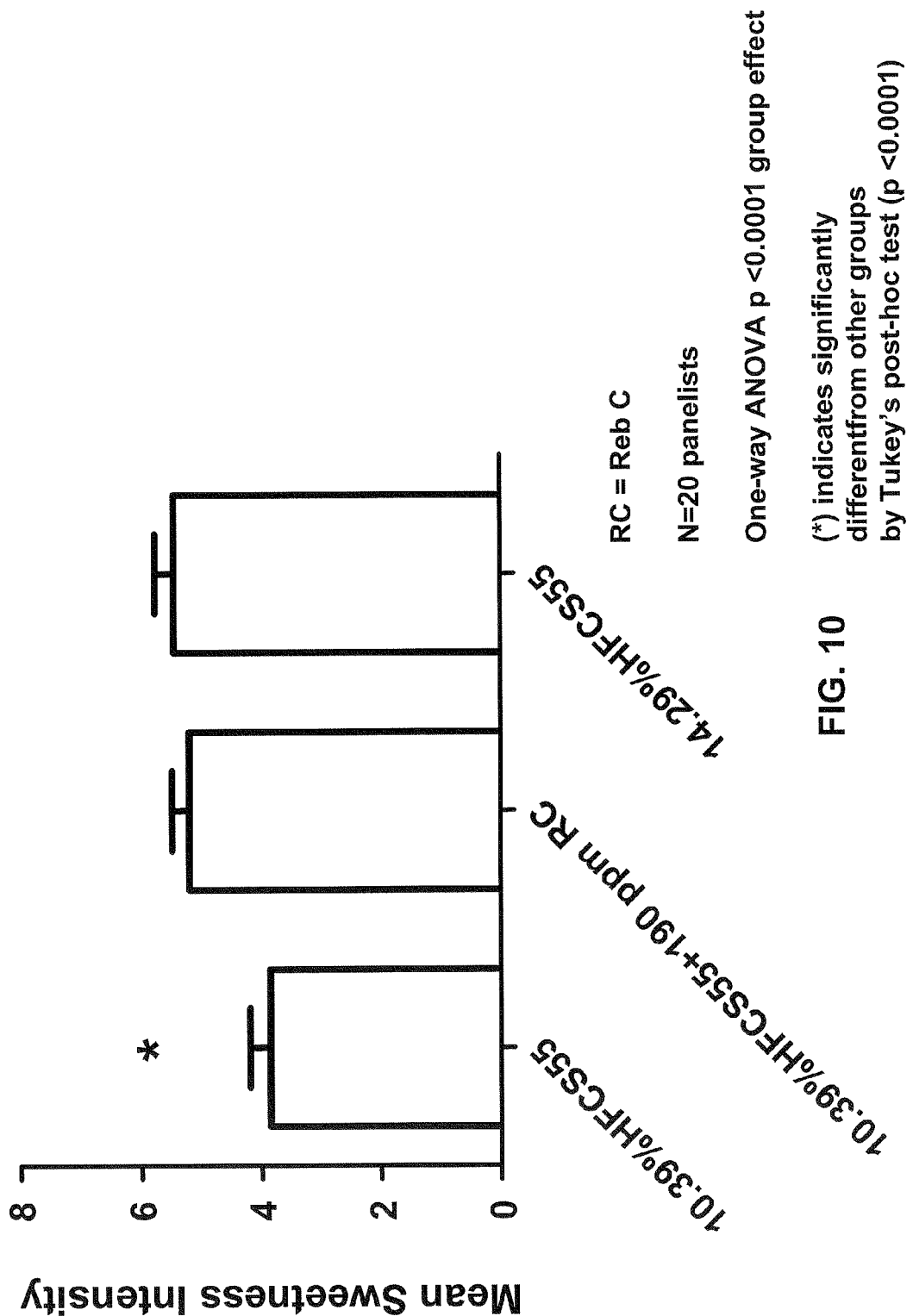

FIG. 10 depicts graphically the results of Example 10 illustrating the sweetness enhancing effect of 190 ppm rebaudioside C on a cola beverage containing 10.39% (w/v-%) high fructose corn syrup 55 (HFCS55) and which is buffered with citric acid.

Figure 11:
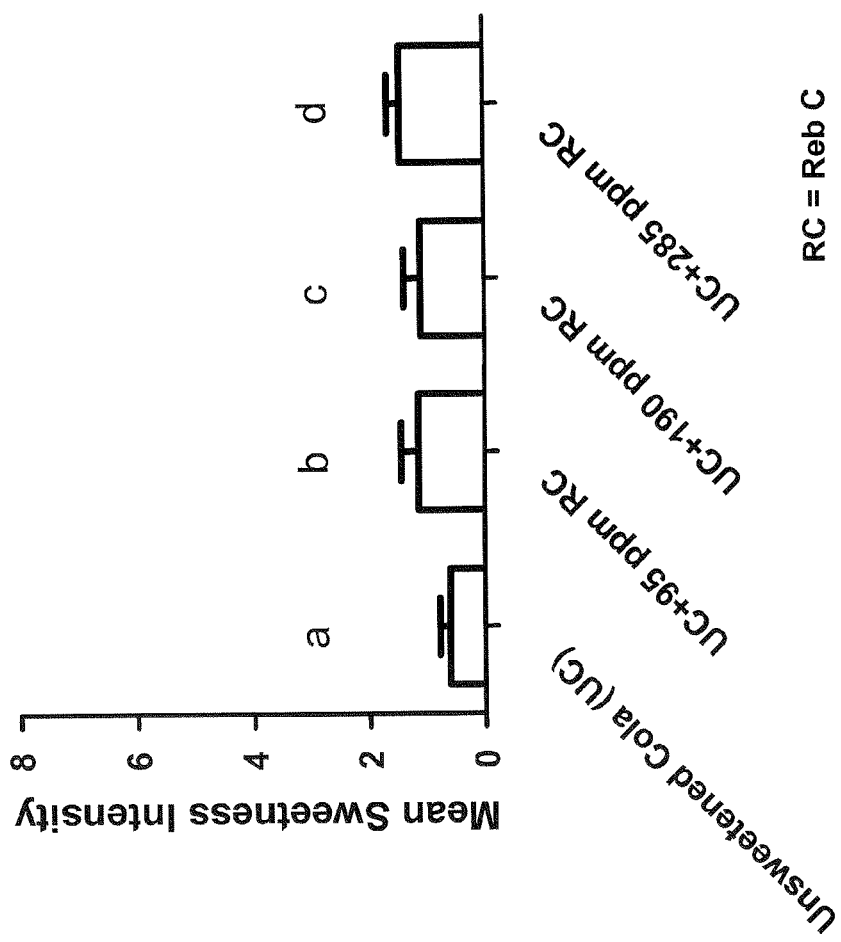

FIG. 11 depicts graphically the results of Example 10 illustrating the effect of 95 ppm, 190 ppm, and 285 ppm rebaudioside C on the sweetness of an unsweetened cola beverage.

Figure 12:
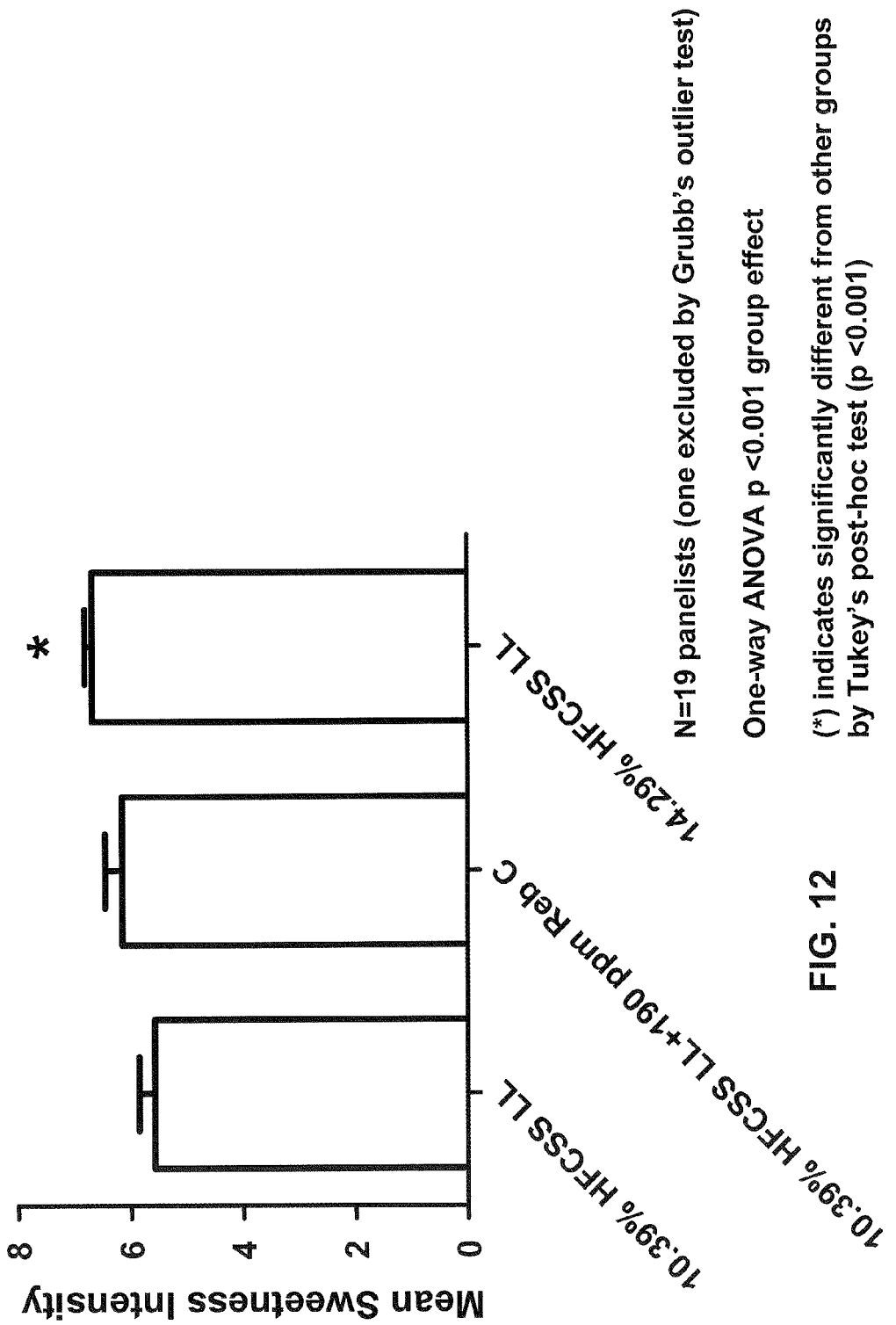

FIG. 12 depicts graphically the results of Example 11 illustrating the sweetness enhancing effect of 190 ppm rebaudioside C on lemon-lime soda containing 10.39% (w/v-%) high fructose corn syrup 55 (HFCS55).

Figure 13:
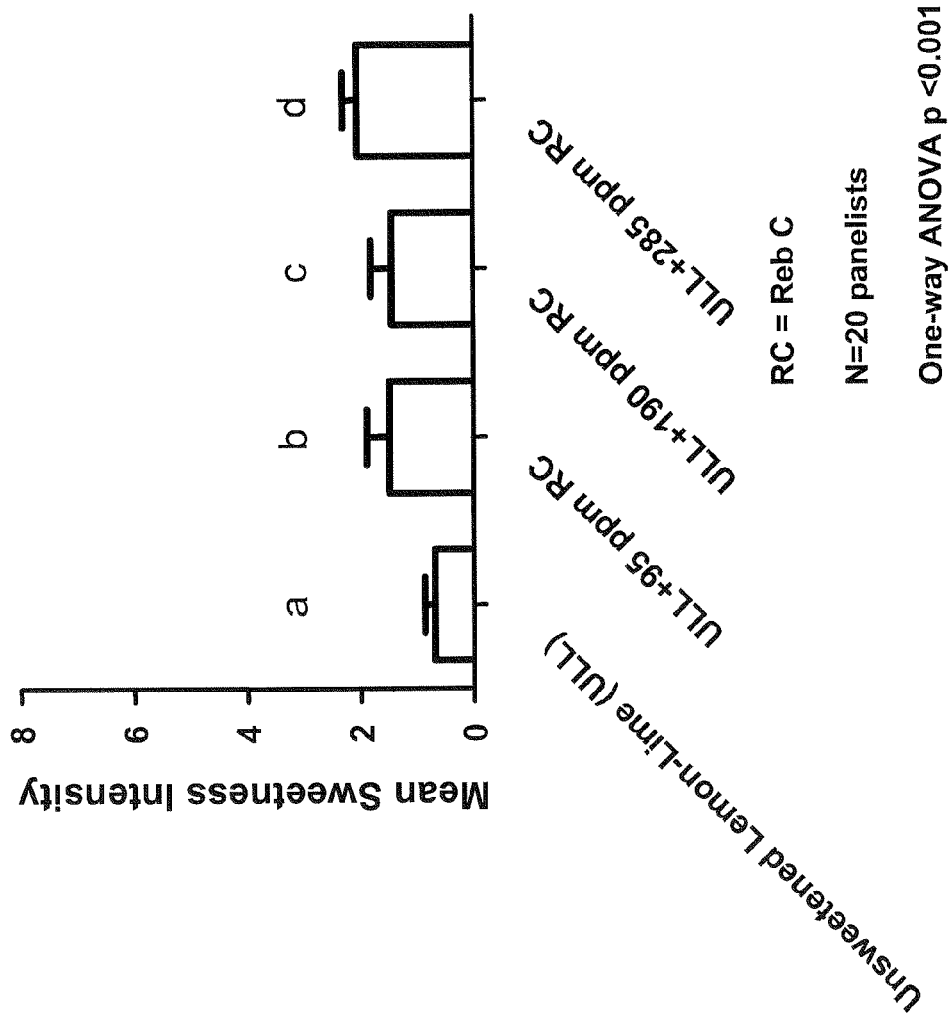

FIG. 13 depicts graphically the results of Example 11 illustrating the effect of 95 ppm, 190 ppm, and 285 ppm rebaudioside C on the sweetness of unsweetened lemon-lime soda.

Figure 14:
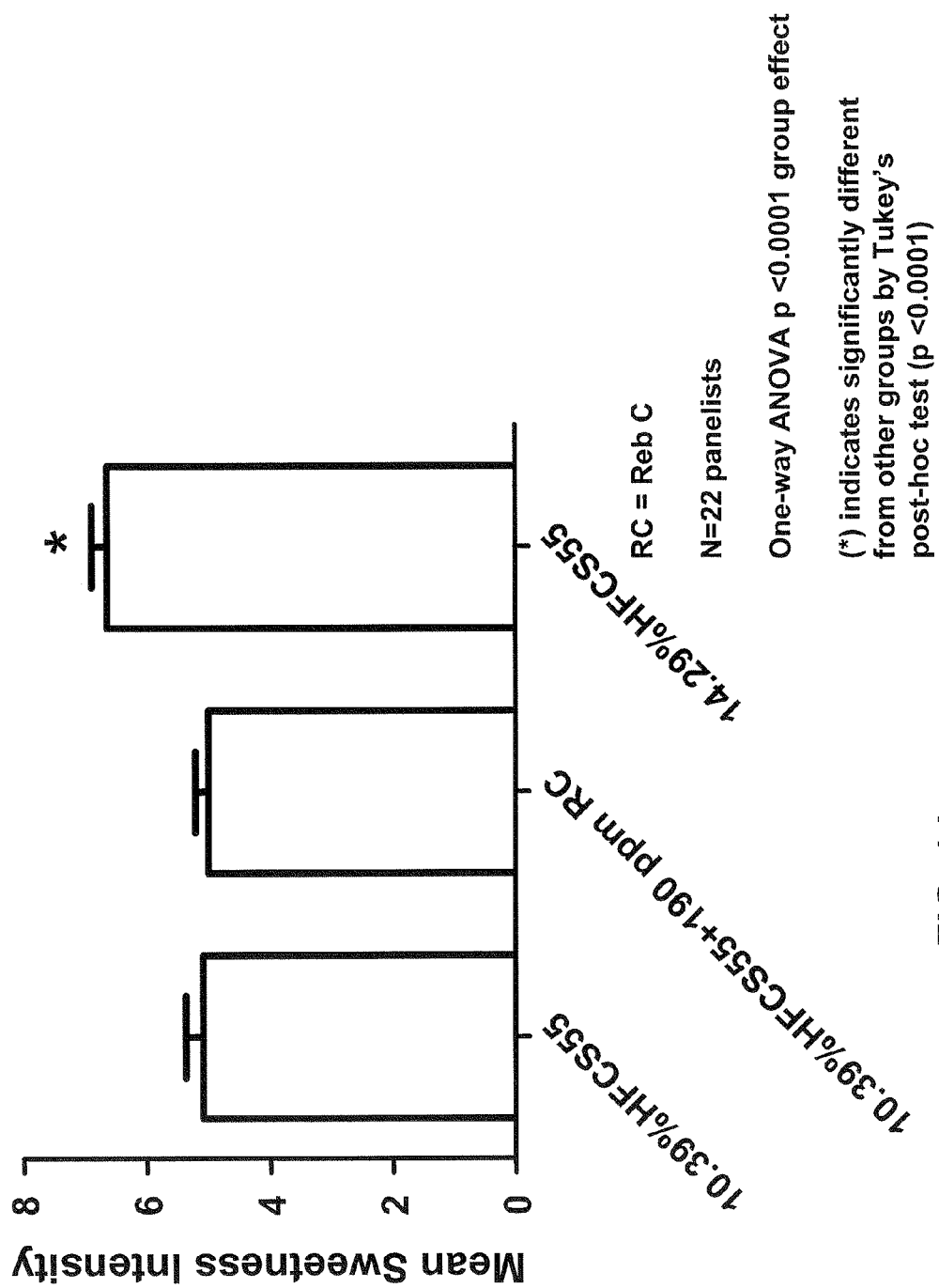

FIG. 14 depicts graphically the results of Example 12 illustrating the effect of 190 ppm rebaudioside C on a cola beverage containing 10.39% (w/v-%) high fructose corn syrup 55 (HFCS55) and which is buffered with phosphoric acid.

Figure 15:
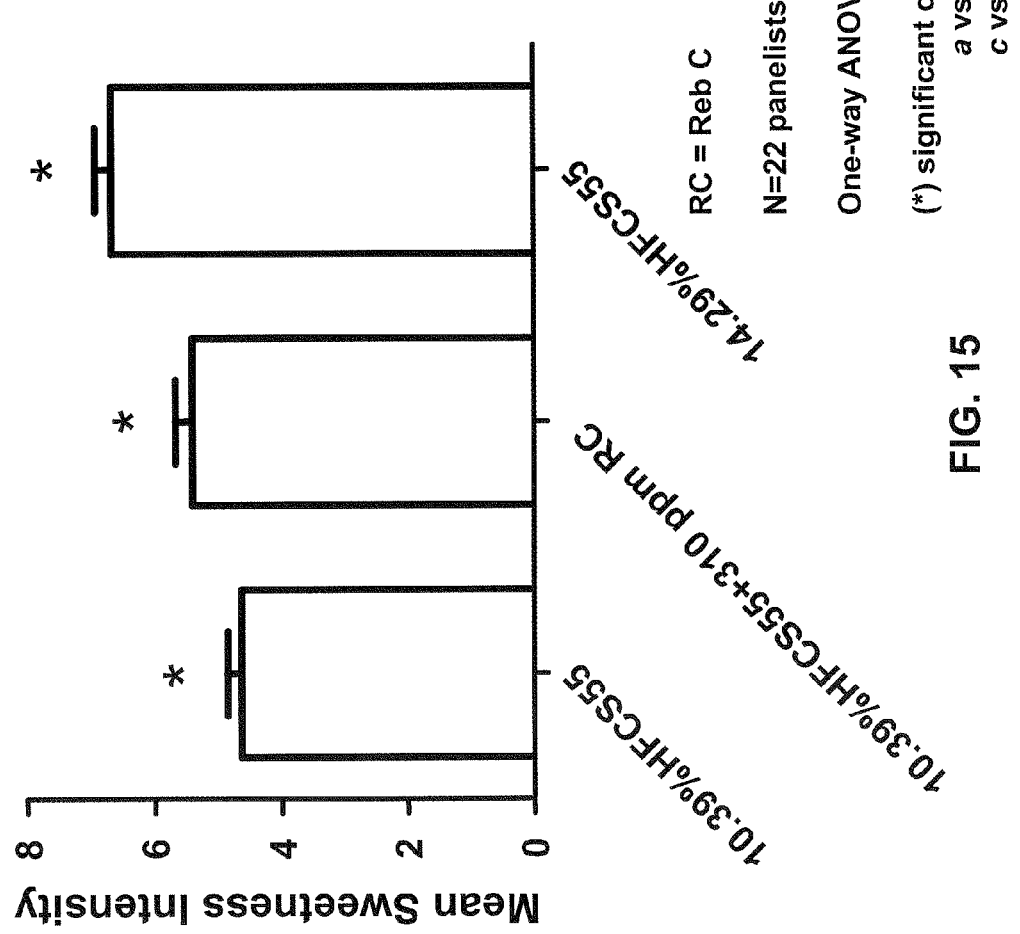

FIG. 15 depicts graphically the results of Example 12 illustrating the effect of 310 ppm rebaudioside C on a cola beverage containing 10.39% (w/v-%) high fructose corn syrup 55 (HFCS55) and which is buffered with phosphoric acid.

Figure 16:
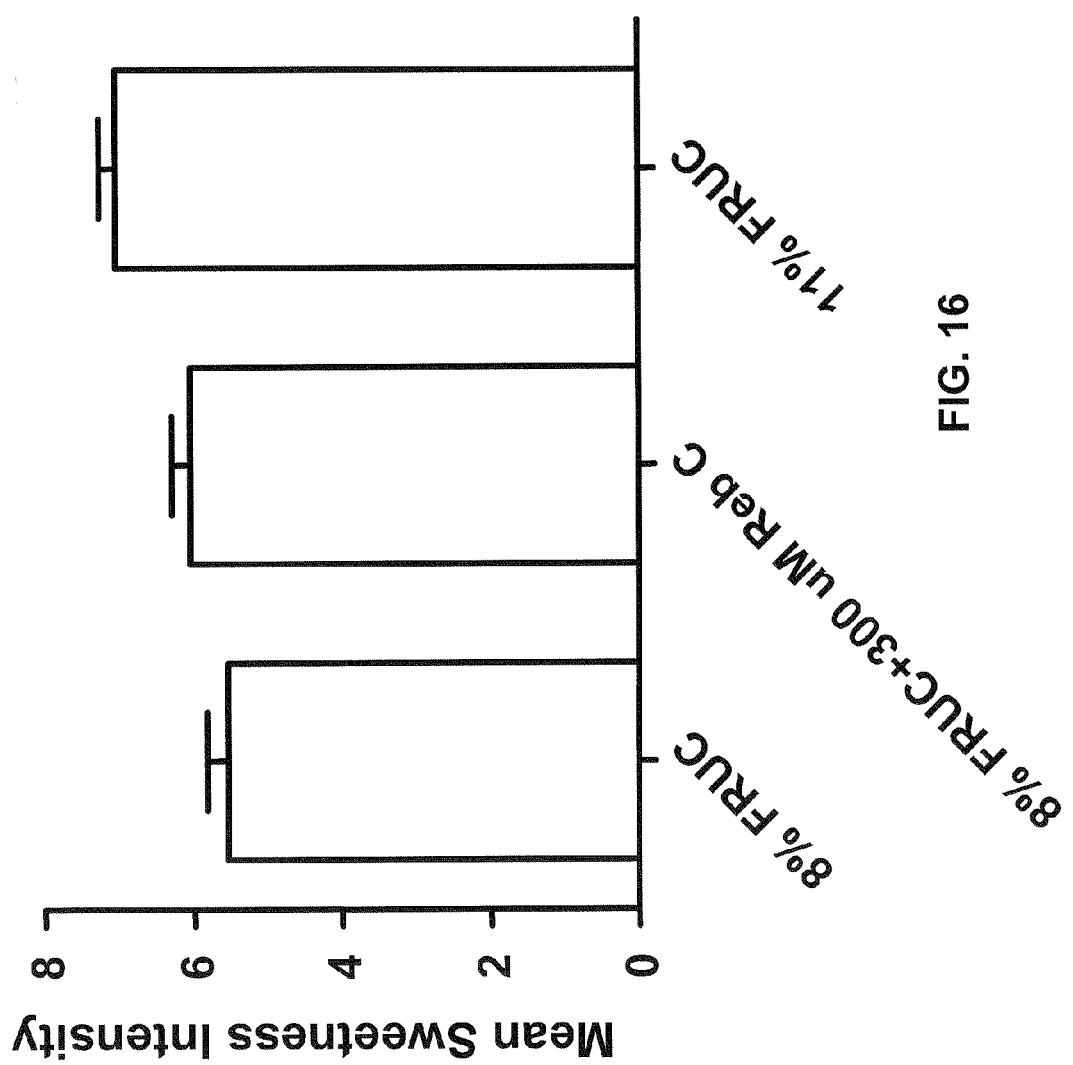

FIG. 16 depicts graphically the results of Example 13 illustrating the sweetness enhancing effect of 300 µM rebaudioside C on 8% (w/v-%) fructose solution.

DETAILED DESCRIPTION OF THE INVENTION

Rebaudioside C (hereinafter also "Reb C") has the following chemical formula:

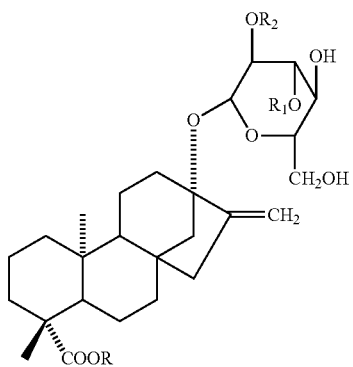

wherein R and $R_1$ are glucose and $R_2$ is rhamnose. Reb C can be prepared by methods known in the art, such as by isolating from *Stevia rebaudiana* plant material as described in U.S. Pat. No. 4,361,697, which is fully incorporated by reference herein in its entirety. Reb C can be used in a purified or isolated form in the present invention. Preferably, Reb C to be used in all embodiments of the present invention has less than 10%, preferably less than 5%, and more preferably less than 3% of impurities other than water. Thus, the compositions of the present invention will include Reb C but no more than 10%, or preferably no more than 5%, or more preferably no more than 3% relative to Reb C concentration of other compounds isolated from *Stevia rebaudiana*.

Reb C may contain one or more asymmetric centers and may thus give rise to enantiomers, diastereomers, and other stereoisomeric forms. The present invention is meant to encompass the uses of all such possible forms, as well as their racemic and resolved forms and mixtures thereof. The individual enantiomers may be separated according to methods known to those of ordinary skill in the art in view of the present disclosure. All tautomers are intended to be encompassed by the present invention as well.

As used herein, the term "stereoisomers" is a general term for all isomers of individual molecules that differ only in the orientation of their atoms in space. It includes enantiomers and isomers of compounds with more than one chiral center that are not mirror images of one another (diastereomers).

The term "chiral center" refers to a carbon atom to which four different groups are attached.

The terms "enantiomer" and "enantiomeric" refer to a molecule that cannot be superimposed on its mirror image and hence is optically active wherein the enantiomer rotates the plane of polarized light in one direction and its mirror image compound rotates the plane of polarized light in the opposite direction.

The term "racemic" refers to a mixture of equal parts of enantiomers and which mixture is optically inactive.

The term "resolution" refers to the separation or concentration or depletion of one of the two enantiomeric forms of a molecule.

The terms "a" and "an" refer to one or more.

As used herein, the term "sweetness intensity" refers to the relative strength of sweet sensation as observed or experienced by an individual, e.g., a human, or a degree or amount of sweetness detected by a taster, for example on the scale from 0 (none) to 8 (very strong) (see Example 1) used in sensory evaluations according to the procedure described in *American Society for Testing Materials, Special Technical Publication*-434: "Manual on Sensory Testing Methods," ASTM International, West Conshohocken, Pa. (1996).

As used herein, the phrase "sweet taste enhancing effect" means that the effect of Reb C is such that the sensory perception of the sweet flavor is potentiated in a more than additive manner, i.e., synergistically.

As used herein, the phrase "synergistically enhance the sweetness" means that the effect of Reb C with a carbohydrate sweetener is such that the sensory perception of the sweet flavor is potentiated in a more than additive manner.

As used herein, the term "off-taste" refers to an amount or degree of taste that is not characteristically or usually found in a consumable. For example, an off-taste is an undesirable taste of a sweetened consumable to the consumers, such as, a bitter taste, a licorice-like taste, a metallic taste, an aversive taste, a nasty taste, an astringent taste, a delayed sweetness onset, and a lingering sweet aftertaste, and the like.

As used herein, the phrase "carbohydrate sweetener" includes caloric sweeteners, such as, sucrose, fructose, glucose, high fructose corn syrup (containing fructose and glucose), xylose, arabinose, rhamnose, and sugar alcohols, such as erythritol, xylitol, mannitol, sorbitol, and inositol.

As used herein, the phrase "the detection threshold for its intrinsic sweetness" refers to the concentration of Reb C, or a stereoisomer thereof, at which the sweetness of Reb C, or a stereoisomer thereof, is perceptible to an individual, e.g., a human.

As used herein in connection with a measured quantity, "about" refers to the normal variations in that measured quantity, as expected by the skilled artisan making the measurement and exercising a level of care commensurate with the objective of measurement and the precision of the measuring equipment.

The term "w/v-%" as used herein means the weight of a component (in grams) for every 100 ml of the liquid composition of the present invention.

The term "w/w-%" as used herein means the weight of a component (in grams) for every gram of the composition of the present invention.

The term "ppm" as used herein means part per million by weight or volume, for example, the weight of the component (in milligrams) per liter of solution, i.e., µg/ml.

As used herein, the phrase "anti-caking agent" and "flow agent" refer to any composition which prevents, reduces, inhibits, or suppresses at least one sweetener molecule from attaching, binding or contacting to another sweetener molecule. Alternatively, anti-caking agent may refer to any composition which assists in content uniformity and uniform dissolution.

As used herein, the term "flavor" means any food-grade material that may be added to the compositions of the present invention to provide a desired flavor to a foodstuff.

As used herein, unless otherwise indicated, the term "detectable amount" is the amount of the aroma component required to produce a scent detectable in the foodstuff.

As used herein, the term "aroma" means any food-grade volatile substance that may be employed to produce a desired scent, for example, when mixed with a foodstuff.

As used herein, the term "binder" refers to any food-grade material that is suitable for facilitating the pressing and formation of tablets.

Reb C can be used in consumables, e.g., in pharmaceuticals, dietary supplements, nutraceuticals, dental hygienic compositions, or other products as a sweetness enhancer, which retain a desired sweetness but contain lower amounts of a carbohydrate sweetener, such as sucrose, glucose and fructose. In one embodiment, the present invention provides a consumable, comprising an effective amount of Reb C and a carbohydrate sweetener in a reduced amount in order to achieve the same level of sweetness when the carbohydrate sweetener is used alone in the traditional amount. By way of brief example, a common carbonated cola beverage may contain about 20 to 30 grams of sugar (e.g., fructose) and about 100 calories per 8 ounce serving. The present invention enables one to prepare a similar cola beverage with substantially reduced sugar and caloric content with the same level of sweetness. Reb C enhances the sweet taste produced by the reduced sugar content, thereby creating an enhanced sweet taste based on the level of the sugar, without exhibiting any off-taste.

Suitable carbohydrate sweeteners of the present invention include, but are not limited to, sucrose, fructose, glucose, high fructose corn syrup (containing fructose and glucose), xylose, arabinose, rhamnose, and sugar alcohols, such as erythritol, xylitol, mannitol, sorbitol, or inositol. In one embodiment of the present invention, the carbohydrate sweetener is sucrose, fructose, glucose, high fructose corn syrup, xylose, arabinose or rhamnose, preferably sucrose, fructose, or glucose. In one aspect of this embodiment, the carbohydrate sweetener is sucrose. In another aspect of this embodiment, the carbohydrate sweetener is glucose. In another aspect of this embodiment, the carbohydrate sweetener is fructose. In another embodiment, the carbohydrate sweetener is a sugar alcohol.

Sucrose, also known as table sugar or saccharose, is a disaccharide of glucose and fructose. Its systematic name is α-D-glucopyranosyl-(1→2)-β-D-fructofuranose. Fructose and glucose are monosaccharide sugars.

In the present invention, Reb C is used in an amount effective to enhance the sweetness of a carbohydrate sweetener without exhibiting any off-taste. Any amount of Reb C, or a stereoisomer thereof, that provides the desired degree of sweetness enhancement can be used. In one embodiment, the concentration at which Reb C used in the present invention is at, slightly above, or below the detection threshold for its intrinsic sweetness. In one embodiment, Reb C used at a concentration of from about 100 ppm to about 600 ppm (from about 105 μM to about 630 μM). In one embodiment, Reb C is used at a concentration of from about 200 ppm to about 500 ppm. In one embodiment, Reb C is used at a concentration of from about 250 ppm to about 450 ppm. In one embodiment, Reb C is used at a concentration of from about 250 ppm to about 400 ppm. In one embodiment, Reb C is used at a concentration of about 300 ppm. In one embodiment, Reb C is used at a concentration of about 285 ppm. In one embodiment, Reb C is present in the consumable of the present invention at a concentration of from about 150 μM to about 600 μM. In one embodiment, Reb C is present in the consumable of the present invention at a concentration of from about 150 μM to about 350 μM. In one embodiment, Reb C is present in the consumable of the present invention at a concentration of from about 250 μM to about 350 μM. In one embodiment, Reb C is present in the consumable of the present invention at a concentration of from about 350 μM to about 600 μM. In one embodiment, Reb C is present in the consumable of the present invention at a concentration of about 150 μM, about 160 μM, about 170 μM, about 180 μM, about 190 μM, about 200 μM about 210 μM, about 220 μM, about 230 μM, about 240 μM, about 250 μM, about 260 μM, about 270 μM, about 280 μM, about 290 μM, about 300 μM, about 310 μM, about 320 μM, about 330 μM, about 340 μM, or about 350 μM. In one embodiment, Reb C is present in the consumable of the present invention at a concentration of about 360 μM, about 370 μM, about 380 μM, about 390 μM, about 400 μM, about 410 μM, about 420 μM, about 430 μM, about 440 μM, about 450 μM, about 460 μM, about 470 μM, about 480 μM, about 490 μM, about 500 μM, about 510 μM, about 520 μM, about 530 μM, about 540 μM, about 550 μM, about 560 μM, about 570 μM, about 580 μM, about 590 μM, or about 600 μM. Useful concentrations of Reb C in the consumable of the present invention are about 250 μM or about 300 μM, and specifically 300 μM. In one embodiment, the ratio of Reb C to sucrose is approximately from 1:150 to 1:200 in a solid consumable. In one embodiment, the consumable of the present invention contains about 0.1 to 0.5 g, preferably about 0.3 g, of Reb C, or a stereoisomer thereof, for every 50 to 100 g of the carbohydrate sweetener.

In one embodiment of the present invention, the carbohydrate sweetener is present in the consumable of the present invention at a concentration of from about 20000 ppm to about 100000 ppm. In one embodiment, the carbohydrate sweetener is present at a concentration of from about 30000 ppm to about 80000 ppm. In one embodiment, the carbohydrate sweetener is present at a concentration of about 50000 ppm. In one embodiment of the present invention, the carbohydrate sweetener is sucrose.

It has been found, that Reb C acts synergistically with carbohydrate sweeteners, such as sucrose and fructose, potentiating sweetness intensity even at high concentrations of the carbohydrate sweetener. As shown in Examples 1 and 2, Reb C acts synergistically with sucrose and fructose, enhancing the sweetness intensity of 5% (w/v-%) sucrose and 5% (w/v-%) fructose solutions at Reb C concentration of 300 μM, i.e., at a concentration of Reb C, where Reb C itself does not significantly contribute to the overall sweet taste of the mixture. Further, the results of Examples 4 and 5 show the sweetness intensity of 8% (w/v-%) sucrose solution is significantly enhanced at Reb C concentrations of 300 μM and 150 μM, respectively. Example 6 shows that Reb C acts synergistically with high fructose corn syrup (HFCS) enhancing the sweetness intensity of an iced tea containing 10.39% (w/v-%) HFCS (equivalent to sweetness intensity of an 8% (w/v-%) sucrose solution) at Reb C concentration of 300 μM. The results of Example 7 show that the sweetness intensity of an iced tea containing 8% (w/v-%) sucrose is significantly enhanced at Reb C concentration of 300 μM. The results of Example 9 show that Reb C acts synergistically with erythritol enhancing the sweetness intensity of a 7.14% (w/v-%) erythritol solution having a sweetness intensity equivalent to a 5% (w/v-%) sucrose solution at Reb C concentration of 285 ppm (300 μM). Examples 10 and 11 show that the sweetness intensity of a cola beverage and lemon-lime soda, respectively, containing 10.39% HFCS and citric acid as an acidulant is synergistically enhanced at Reb C concentration of 190 ppm.

It has further been found that the acidulant or the acid component (e.g., citric acid and phosphoric acid) present in beverages containing a carbohydrate sweetener, such as cola beverages, have an effect on the sweetness enhancement by Reb C. The results of Example 12 show that Reb C enhances the sweetness intensity of a cola beverage containing phosphoric acid as an acidulant, but a higher concentration of Reb C is required than in beverages having citric acid as an acidulant (see Example 10).

Therefore, Reb C is especially useful for enhancing the sweetness of a consumable having a sweetness intensity equivalent to about 5-12% (w/v-%) sucrose solution. In this aspect of the invention, the consumable is preferably a sweet juice or a soft drink having a sweetness intensity equivalent to about 5-12% (w/v-%) sucrose solution. Reb C can be added to this consumable having a sweetness intensity equivalent to about 5-12% (w/v-%) sucrose solution by admixing it with the consumable or admixing it with a component of the consumable. In one embodiment, Reb C is added to a consumable having a sweetness intensity equivalent to about 5% (w/v-%), about 6% (w/v-%), about 7% (w/v-%), or about 8% (w/v-%) sucrose solution to enhance the sweetness of the consumable. In one embodiment, Reb C is added to a consumable having a sweetness intensity equivalent to about 9% (w/v-%), about 10% (w/v-%), about 11% (w/v-%), or about 12% (w/v-%) sucrose solution to enhance the sweetness of the consumable. In one embodiment, the sweetness intensity of the consumable of the present invention containing Reb C is equivalent to about 5-7% (w/v-%) sucrose solution. In another embodiment, the sweetness intensity of the consumable of the present invention containing Reb C is equivalent to about 8-12% (w/v-%) sucrose solution. In one embodiment, the sweetness intensity of the consumable of the present invention containing Reb C is equivalent to about 5% (w/v-%), about 6% (w/v-%), about 7% (w/v-%), about 8% (w/v-%), about 9% (w/v-%), about 10% (w/v-%), about 11% (w/v-%), or about 12% (w/v-%) sucrose solution.

Consumables include all food products, dietary supplements, nutraceuticals, pharmaceutical compositions, dental hygienic compositions, and cosmetic products. Also, one or more sweeteners other than carbohydrate sweeteners can be present in the consumables of the present invention. The carbohydrate sweetener can be present in the consumable inherently (e.g., in food products containing fruits) or the carbohydrate sweetener is added into the consumable.

The phrase "food product" as used herein includes, but is not limited to, fruits, vegetables, juices, meat products such as ham, bacon and sausage; egg products, fruit concentrates, gelatins and gelatin-like products such as jams, jellies, preserves, and the like; milk products such as ice cream, sour cream, yoghurt, and sherbet; icings, syrups including molasses; corn, wheat, rye, soybean, oat, rice and barley products, cereal products, nut meats and nut products, cakes, cookies, confectionaries such as candies, gums, fruit flavored drops, and chocolates, chewing gum, mints, creams, icing, ice cream, pies and breads, beverages such as coffee, tea, carbonated soft drinks, such as COKE® and PEPSI®, non-carbonated soft drinks, juices and other fruit drinks, sports drinks such as GATORADE®, coffee, teas, iced teas, cola, alcoholic beverages, such as beers, wines and liquors, and KOOL-AID.® Preferably, the food products in which the sweetness of the carbohydrate sweetener is enhanced with Reb C contains a decreased level of the carbohydrate sweetener. For example, an improved carbonated soft drink can be produced with the same sweetness as the known carbonated soft drink but with a lower sugar content by adding Reb C, or a stereoisomer thereof.

Food products also include condiments such as herbs, spices and seasonings, flavor enhancers, such as monosodium glutamate. A food product also includes prepared packaged products, such as dietetic sweeteners, liquid sweeteners, granulated flavor mixes which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like. Food products also include diet or low-calorie food and beverages containing little or no sucrose. Especially preferred food products are carbonated beverages containing Reb C. Other examples of food products envisioned in accordance with the present invention are described below and throughout the specification.

In another embodiment, the food product is selected from the group consisting of fruits, vegetables, juices, meat products such as ham, bacon and sausage; egg products, fruit concentrates, gelatins and gelatin-like products such as jams, jellies, preserves, and the like; milk products such as ice cream, sour cream, yoghurt, and sherbet; icings, syrups including molasses; corn, wheat, rye, soybean, oat, rice and barley products, cereal products, nut meats and nut products, cakes, cookies, confectionaries such as candies, gums, fruit flavored drops, and chocolates, creams, icing, ice cream, pies and breads.

In one embodiment, the invention is directed to a method of decreasing the amount of a carbohydrate sweetener in a consumable, such as a food product or a pharmaceutical composition, to exhibit a given level of sweetness, wherein the method comprises reducing the amount of the carbohydrate sweetener and adding Reb C in an amount effective to maintain the given level of sweetness of the consumable.

In one embodiment, the food product is a beverage or a drink comprising a carbohydrate sweetener and Reb C, or a stereoisomer thereof. Examples of suitable beverages in which having a sweet taste is desired include, but are not limited to coffee, teas, such as black tea, green tea, fermented tea, semi-fermented tea, carbonated soft drinks, such as COKE® and PEPSI®, non-carbonated soft drinks, lemonade, juices and other fruit drinks, sports drinks, such as GATORADE®, iced teas, cola, alcoholic beverages, such as beers, wines and liquors, and KOOL-AID.® In one embodiment, Reb C is present at a concentration of from about 100 ppm to about 600 ppm (from about 105 $\mu$M to about 630 $\mu$M). In one embodiment, Reb C is present at a concentration of from about 200 ppm to about 500 ppm. In one embodiment, Reb C is present at a concentration of from about 250 ppm to about 450 ppm. In one embodiment, Reb C is present at a concentration of from about 250 ppm to about 400 ppm. In one embodiment, Reb C is present at a concentration of about 300 ppm. In one embodiment, Reb C is present at a concentration of about 285 ppm. In one embodiment, Reb C is present at a concentration of from about 150 $\mu$M to about 600 $\mu$M. In certain embodiments, Reb C is present at a concentration of from about 150 $\mu$M to about 350 $\mu$M. In one embodiment, Reb C is present at a concentration of from about 250 $\mu$M to about 350 $\mu$M. In one embodiment, Reb C is present at a concentration of from about 350 $\mu$M to about 600 $\mu$M. In one embodiment, Reb C is present in the beverage or drink at a concentration of about 150 $\mu$M, about 160 $\mu$M, about 170 $\mu$M, about 180 $\mu$M, about 190 $\mu$M, about 200 $\mu$M, about 210 $\mu$M, about 220 $\mu$M, about 230 $\mu$M, about 240 $\mu$M, about 250 $\mu$M, about 260 µM, about 270 µM, about 280 µM, about 290 µM, about 300 µM, about 310 µM, about 320 µM, about 330 µM, about 340 µM, or about 350 µM. In one embodiment, Reb C is present in the consumable of the present invention at a concentration of about 360 µM, about 370 µM, about 380 µM, about 390 µM, about 400 µM, about 410 µM, about 420 µM, about 430 µM, about 440 µM, about 450 µM, about 460 µM, about 470 µM, about 480 µM, about 490 µM, about 500 µM, about 510 µM, about 520 µM, about 530 µM, about 540 µM, about 550 µM, about 560 µM, about 570 µM, about 580 µM, about 590 µM, or about 600 µM. Useful concentrations of Reb C in the beverage or drink of the present invention is about 250 µM or about 300 µM, and specifically 300 µM. In one embodiment, the beverage or drink comprises one carbohydrate sweetener. In another embodiment, it comprises more than one carbohydrate sweetener. In certain embodiments, the beverage or drink comprises sucrose and corn syrup, or it comprises sucrose and aspartame as sweeteners.

One embodiment of the invention is directed to a method of enhancing the sweet taste of a cola beverage, such as COKE® or PEPSI®, comprising administering to a subject a cola drink, comprising a carbohydrate sweetener and Reb C in an amount to enhance the sweet taste of the carbohydrate sweetener without exhibiting any off-taste. In a preferred embodiment, the cola beverage contains a reduced amount of sugar but maintains substantially the original level of sweet taste.

Cola beverages are prepared by mixing cola concentrate with carbonated water. Typically about 50 mL of cola concentrate is added per 250 mL of carbonated water. Cola concentrate can be prepared by mixing cola flavor, caramel color, and optionally caffeine with water, one or more carbohydrate sweeteners, Reb C, and one or more acid components, such as phosphoric acid or citric acid.

A cola flavor refers to either a natural or artificial flavor. Such cola flavors are commercially available. Commercial cola flavors are available, for example, from International Flavor and Fragrances, Dayton, N.J.; Artificial—#13573011 and Natural #K3559549. Commercial cola flavors are also available from Tastemaker, Cincinnati, Ohio, and Givaudan Roure, Clifton, N.J.

The acid component (acidulant) refers to an ingredient that contributes sourness to the beverage and is added to balance the flavor profile. Acids include malic acid, citric acid, phosphoric acid or combinations thereof.

For example, the cola concentrate can prepared by mixing phosphoric acid (75% Rhone-Poulenc), citric acid (anhydrous, ADM, Decatur, Ill.), caffeine (Mallinckrodt, Paris, Ky.), caramel Color (DS400, Sethness, Chicago, Ill.), cola Flavor (SN018976, International Flavors and Fragrances, Dayton, N.J.), sucrose, Reb C, and water. The concentrate is blended until all ingredients are dissolved (30-40 minutes) using a magnetic stirring plate. Fifty milliliters of the concentrate are added to 250 mL of carbonated water to complete the preparation of the cola beverage. Fifty milliliters of cola concentrate typically contains from 0.01 to 5 mL of phosphoric acid, preferably about 0.01-1 mL, 0.1 to 100 g of sucrose, preferably about 1-10 g, about 0.1 to 0.5 g of Reb C, preferably about 0.3 g of Reb C, for every 50 to 100 g of sucrose, about 0.001 g to 0.1 g of citric acid, preferably about 0.005-0.1 g, 0.001 to 1 g of caffeine, preferably about 0.01 to 0.1 g of caffeine, 0.01 to 5 g of caramel flavor, preferably about 0.05 to 1 g, 0.001 to about 10 mL of cola flavor, preferably about 0.01 to about 2 mL.

In certain embodiments, the improved food product, such as the cola beverage, e.g., COKE® or PEPSI,® contains a reduced amount of sugar compared to the prior art cola beverage. The method can be performed such that the amount of sugar required to maintain the desired sweetness of the cola beverage is reduced by at least about 10%, 20%, 30%, 40%, 50%, 60%, 70%, 80%, 90%, or 95%, or from about 60% to about 99%, or alternatively from about 20% to about 50%. Thus, in a more specific embodiment, the cola beverage comprising a carbohydrate sweetener and Reb C, contains Reb C, or a stereoisomer thereof, in an amount sufficient to reduce the amount of sugar required to maintain the desired sweetness of the beverage by 10%, 20%, 30%, 40%, 50%, 60%, 70%, 80%, 90%, or 95%, or from about 60% to about 99%, or alternatively from about 30% to about 70%. Of course, in other embodiments, the amount of sugar required may be decreased to differing extents.

Rebaudioside C, or a stereoisomer thereof, can be added into the consumable, containing at least one carbohydrate sweetener, in need of sweetness enhancement as such or in a composition comprising rebaudioside C, or a stereoisomer thereof, and a bulking agent. In one embodiment, rebaudioside C, or a stereoisomer is present in this composition in an amount of from about 100 ppm to about 600 ppm.

In one embodiment, the food product of the present invention comprises a tabletop sweetener composition, comprising (i) at least one carbohydrate sweetener, (ii) rebaudioside C, or a stereoisomer thereof, and (iii) optionally a bulking agent. Rebaudioside C, or a stereoisomer thereof, is present in an amount effective to synergistically enhance the sweetness of the carbohydrate sweetener. In one embodiment, rebaudioside C, or a stereoisomer thereof, is present in an amount of from about 100 ppm to about 600 ppm.

In one embodiment, the food product of the present invention comprises a tabletop sweetener composition, consisting essentially of (i) at least one carbohydrate sweetener, (ii) rebaudioside C, or a stereoisomer thereof, and (iii) optionally a bulking agent. Rebaudioside C, or a stereoisomer thereof, is present in an amount effective to synergistically enhance the sweetness of the carbohydrate sweetener. Rebaudioside C, or a stereoisomer thereof, is present in an amount of from about 100 ppm to about 600 ppm.

In one embodiment, one serving size of the tabletop sweetener of the present invention provides a sweetness intensity equivalent to a 5-12% (w/v-%) sucrose solution. In one embodiment, one serving size of the tabletop sweetener of the present invention provides a sweetness intensity equivalent to an 8-12% (w/v-%) sucrose solution.

In one embodiment, the tabletop sweetener of the present invention does not comprise a bulking agent. In one embodiment, the tabletop sweetener of the present invention comprises a bulking agent. Suitable bulking agents include maltodextrin, polydextrose, fructooligosaccharides, cellulose and cellulose derivatives, isomalt, maltose, tagatose, lactose, inulin, glycerol, propylene glycol, polyols, xylose, ribulose, mannose, and the like. The amount of bulking agent used is typically the smallest amount that provides for accurate delivery. Especially suitable bulking agents include dextrose and maltodextrin.

In one embodiment, the tabletop sweetener composition of the present invention comprises an anti-caking agent or a flow agent. Suitable anti-caking agents include cream of tartar, calcium cilicate, silicon dioxide, microcrystalline cellulose (Avicel®), and tricalcium phosphate. In one embodiment, the anti-caking agents are present in the tabletop sweetener composition in an amount from about 0.001% to about 3% by weight of the tabletop sweetener composition.

In one embodiment, the tabletop sweetener composition of the present invention comprises a flavor or aroma. Suitable flavors include, for example, cream, hazelnut, vanilla, chocolate, cinnamon, pecan, lemon, lime, raspberry, peach, mango, vanillin, butter, butterscotch, tea, orange, tangerine, caramel, strawberry, watermelon, bubblegum, cantaloupe, guava, kiwi, papaya, coconut, mint, spearmint, and combinations thereof. Suitable aromas include, for example, essential oils (citrus oil), expressed oils (orange oil), distilled oils (rose oil), extracts (fruits), anethole (liquorice, anise seed, ouzo, fennel), anisole (anise seed), benzaldehyde (marzipan, almond), benzyl alcohol (marzipan, almond), camphor (cinnamomum camphora), cinnamaldehyde (cinnamon), citral (citronella oil, lemon oil), d-limonene (orange), ethyl butanoate (pineapple), eugenol (clove oil), furaneol (strawberry), furfural (caramel), linalool (coriander, rose wood), menthol (peppermint), methyl butanoate (apple, pineapple), methyl salicylate (oil of wintergreen), neral (orange flowers), nerolin (orange flowers), pentyl butanoate (pear, apricot), pentyl pentanoate (apple, pineapple), sotolon (maple syrup, curry, fennugreek), strawberry ketone (strawberry), substituted pyrazines, e.g., 2-ethoxy-3-isopropylpyrazine; 2-methoxy-3-sec-butylpyrazine; and 2-methoxy-3-methylpyrazine (toasted seeds of fenugreek, cumin, and coriander), thujone (juniper, common sage, Nootka cypress, and wormwood), thymol (camphorlike), trimethylamine (fish), vanillin (vanilla), and combinations thereof Preferred aroma components according to the present invention include, essential oils (citrus oil), expressed oils (orange oil), distilled oils (rose oil), extracts (fruits), benzaldehyde, d-limonene, furfural, menthol, methyl butanoate, pentyl butanoate, salts, and combinations thereof The aroma may be present in any amount in the composition. Preferably, the aroma component is present in an amount from about 2- to about 10-times the detectable amount. More preferably, the aroma component is present in an amount from about 2- to about 5-times the detectable amount.

In one embodiment, the tabletop sweetener composition of the present invention comprises a binder. Suitable binders include any conventional binders as long as the binder does not substantially interfere with the self-mixing or the organoleptic properties of the foodstuff, such as, for example, microcrystalline cellulose, gum traganth, gelatin, leucine, lactose, and combinations thereof The binder may be present in an amount of from about 10% to about 15% by weight of the total composition.

Tabletop sweetener compositions of the present invention can be packaged in numerous different forms, such as, for example, powder form, granular form, sachets, packets, tablets, pellets, cubes, solids, liquids, dissolvable sweetening strips, and sprays.

In one embodiment, a tabletop sweetener comprises a single serving (portion control) packet comprising a dry-blend of a sweetener composition formulation. Dry-blend formulations generally comprise powder or granules. The tabletop sweetener packet may be of any size, for example about 2.5 by 1.5 inches and hold approximately 1 gram of a sweetener composition of the present invention having a sweetness equivalent to 2 teaspoons of granulated sugar (about 8 g). In one embodiment, a dry-blend tabletop sweetener formulation comprises Reb C, or a stereoisomer thereof, in an amount of from about 1% (w/w-%) to about 10% (w/w-%) of the tabletop sweetener composition.

Solid tabletop sweetener fauns include cubes and tablets. For example, conventional cubes are equivalent in size of a standard cube of granulated sugar, which is approximately $2.2 \times 2.2 \times 2.2$ cm$^3$ and weigh approximately 8 grams. In one embodiment, a solid tabletop sweetener is in the form of a tablet or any other form known to those skilled in the art.

In one embodiment, the tabletop sweetener composition of the present invention is in the form of a liquid. In this aspect of the invention, Reb C, or a stereoisomer thereof, and at least one carbohydrate are combined with a liquid carrier. Suitable non-limiting examples of carriers for liquid tabletop sweeteners include water, alcohol, polyol, glycerin base or citric acid base dissolved in water, and mixtures thereof.

The sweetness equivalent of a tabletop sweetener composition for any of the forms described herein or known in the art can be varied to obtain a desired sweetness profile. For example, a tabletop sweetener composition can comprise a sweetness comparable to that of an equivalent amount of standard sugar. In another embodiment, the tabletop sweetener composition can comprise a sweetness up to 100 times that of an equivalent amount of sugar. In another embodiment, the tabletop sweetener composition can comprise a sweetness of up to 90 times, 80 times, 70 times, 60 times, 50 times, 40 times, 30 times, 20 times, 9 times, 8 times, 7 times, 6 times, 5 times, 4 times, 3 times, and 2 times that of an equivalent amount of sugar.

In one embodiment, the tabletop sweetener composition can also be formulated for targeted uses such as, for example, in beverage, food, pharmaceutical, nutraceutical, cosmetics, and in any other products that may be sweetened. For example, a tabletop sweetener composition for baking can be formulated having additional protecting agents, such as encapsulants. Other forms will be readily apparent to those skilled in the tabletop sweetener art.

Commonly used methods for making powder or granulated sweetener formulations for packets include fluid bed agglomeration process. Other methods for making tabletop sweetener compositions are well known to those of ordinary skill in the art.

In one embodiment, the present invention provides a method of making a tabletop sweetener composition, comprising including (i) at least one carbohydrate sweetener, (ii) rebaudioside C, or a stereoisomer thereof, and (iii) optionally a bulking agent. Rebaudioside C, or a stereoisomer thereof, is present in an amount effective to synergistically enhance the sweetness of the carbohydrate sweetener. In one embodiment, when said rebaudioside C, or a stereoisomer thereof, is included in an amount of from about 100 ppm to about 600 ppm.

Food products of the present invention also include animal food products, comprising a carbohydrate sweetener and Reb C, or a stereoisomer thereof, in an amount sufficient to enhance the sweet taste of the carbohydrate sweetener without exhibiting any off-taste. Animal food products are well known in the art, see, e.g., U.S. Pat. No. 6,403,142, and include dog food, cat food, rabbit food, and the like. The animal food product also include food products useful for feeding livestock, such as cattle, bison, pigs, chicken, and the like. In another embodiment, the animal food product of the present invention is a solid hypoallergenic pet food, comprising a component that contains protein or protein fragments wherein all of said component is partially hydrolyzed and further comprises Reb C, or a stereoisomer thereof. In certain embodiments, Reb C is present in the animal food product in an amount as described above for food products.

In one embodiment, the consumable is a pharmaceutical composition comprising a carbohydrate sweetener and Reb C, or a stereoisomer thereof. Preferred compositions are pharmaceutical compositions comprising Reb C, or a stereoisomer thereof, and one or more pharmaceutically acceptable excipients. These pharmaceutical compositions may be used to formulate pharmaceutical drugs containing one or more active agents that exert a biological effect other than sweetness enhancement. The pharmaceutical composition preferably further comprises one or more active agents that exert a biological effect. Such active agents include pharmaceutical and biological agents that have an activity other than taste enhancement. Such active agents are well known in the art. See, e.g., The Physician's Desk Reference. Such compositions can be prepared according to procedures known in the art, for example, as described in Remington's Pharmaceutical Sciences, Mack Publishing Co., Easton, Pa., USA. In one embodiment, such an active agent includes bronchodilators, anorexiants, antihistamines, nutritional supplements, laxatives, analgesics, anesthetics, antacids, $H_2$-receptor antagonists, anticholinergics, antidiarrheals, demulcents, antitussives, antinauseants, antimicrobials, antibacterials, antifungals, antivirals, expectorants, anti-inflammatory agents, antipyretics, and mixtures thereof. In one embodiment, the active agent is selected from the group consisting of antipyretics and analgesics, e.g., ibuprofen, acetaminophen, or aspirin; laxatives, e.g., phenolphthalein dioctyl sodium sulfosuccinate; appetite depressants, e.g., amphetamines, phenylpropanolamine, phenylpropanolamine hydrochloride, or caffeine; antacids, e.g., calcium carbonate; antiasthmatics, e.g., theophylline; antidiuretics, e.g., diphenoxylate hydrochloride; agents active against flatulence, e.g., simethecon; migraine agents, e.g., ergotaminetartrate; psychopharmacological agents, e.g., haloperidol; spasmolytics or sedatives, e.g., phenobarbitol; antihyperkinetics, e.g., methyldopa or methylphenidate; tranquilizers, e.g., benzodiazepines, hydroxinmeprobramates or phenothiazines; antihistaminics, e.g., astemizol, chloropheniramine maleate, pyridamine maleate, doxlamine succinate, bromopheniramine maleate, phenyltoloxamine citrate, chlorocyclizine hydrochloride, pheniramine maleate, and phenindamine tartrate; decongestants, e.g., phenylpropanolamine hydrochloride, phenylephrine hydrochloride, pseudoephedrine hydrochloride, pseudoephedrine sulfate, phenylpropanolamine bitartrate, and ephedrine; beta-receptor blockers, e.g., propanolol; agents for alcohol withdrawal, e.g., disulfiram; antitussives, e.g., benzocaine, dextromethorphan, dextromethorphan hydrobromide, noscapine, carbetapentane citrate, and chlophedianol hydrochloride; fluorine supplements, e.g., sodium fluoride; local antibiotics, e.g., tetracycline or cleocine; corticosteroid supplements, e.g., prednisone or prednisolone; agents against goiter formation, e.g., colchicine or allopurinol; antiepileptics, e.g., phenytoine sodium; agents against dehydration, e.g., electrolyte supplements; antiseptics, e.g., cetylpyridinium chloride; NSAIDs, e.g., acetaminophen, ibuprofen, naproxen, or salts thereof; gastrointestinal active agents, e.g., loperamide and famotidine; various alkaloids, e.g., codeine phosphate, codeine sulfate, or morphine; supplements for trace elements, e.g., sodium chloride, zinc chloride, calcium carbonate, magnesium oxide, and other alkali metal salts and alkali earth metal salts; vitamins; ion-exchange resins, e.g., cholestyramine; cholesterol-depressant and lipid-lowering substances; antiarrhythmics, e.g., N-acetylprocainamide; and expectorants, e.g., guaifenesin.

Active substances which have a particularly unpleasant taste include antibacterial agents such as ciprofloxacin, ofloxacin, and pefloxacin; antiepileptics such as zonisamide; macrolide antibiotics such as erythromycin; beta-lactam antibiotics such as penicillins and cephalosporins; psychotropic active substances such as chlorpromazine; active substances such as sulpyrine; and agents active against ulcers, such as cimetidine. In another embodiment, the pharmaceutical composition of the present invention comprises at least one amino acid selected from the group consisting of glycine, L-alanine, L-arginine, L-aspartic acid, L-cystine, L-glutamic acid, L-glutamine, L-histidine, L-isoleucine, L-leucine, L-lysine, L-methionine, L-ornithine, L-phenylalanine, L-proline, L-serine, L-threonine, L-tryptophan, L-tyrosine, L-valine, creatine, and mixtures thereof.

The pharmaceutical compositions of the present invention are administered to a subject in any form suitable to achieve their intended purpose. Preferably, however, the composition is one which can be administered buccally or orally. Alternatively, the pharmaceutical composition may be an oral or nasal spray. The subject is any animal, such as a human, although the invention is not intended to be so limited. Other suitable animals include canines, felines, dogs, cats, livestock, horses, cattle, sheep, and the like. A veterinary composition, as used herein, refers to a pharmaceutical composition that suitable for non-human animals. Such veterinary compositions are known in the art.

In another embodiment, the pharmaceutical composition is a liquid dosage form for oral administration, including pharmaceutically acceptable emulsions, solutions, suspensions, syrups, and elixirs. In addition to the active compounds, the liquid dosage forms may contain inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethyl formamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar, and tragacanth, and mixtures thereof.

The pharmaceutical composition of the present invention can be in the form of a chewable tablet. Chewable tablets are known in the art. See, e.g., U.S. Pat. Nos. 4,684,534 and 6,060,078, each of which is incorporated by reference in its entirety. Any kind of medicament may be contained in the chewable tablet, preferably a medicament of bitter taste, natural plant extracts or other organic compounds. More preferably, vitamins such as vitamin A, vitamin B, vitamin $B_1$, vitamin $B_2$, vitamin $B_6$, vitamin C, vitamin E and vitamin K; natural plant extracts such as Sohgunjung-tang extracts, Sipchundaebo-tang extracts and *Eleutherococcus senticosus* extracts; organic compounds such as dimenhydrinate, meclazine, acetaminophen, aspirin, phenylpropanolamine, and cetylpyridinium chloride; or gastrointestinal agents such as dried aluminum hydroxide gel, domperidone, soluble azulene, L-glutamine and hydrotalcite may be contained in the core.

The pharmaceutical composition of the present invention can be an orally disintegrating composition. Orally disintegrating tablets are known in the art. See, e.g., U.S. Pat. Nos. 6,368,625 and 6,316,029, each of which is hereby incorporated by reference in its entirety.

The pharmaceutical composition of the present invention can be a nasal composition, comprising a carbohydrate sweetener and Reb C, or a stereoisomer thereof. Nasal sprays are known in the art. See, e.g., U.S. Pat. No. 6,187,332. Addition of Reb C to a nasal spray can reduce the experience of an unpleasant taste associated with the composition of the nasal spray.

The pharmaceutical composition of the present invention can be a solid dosage form, comprising a carbohydrate sweetener and Reb C, or a stereoisomer thereof, and a water and/or saliva activated effervescent granule, such as one having a controllable rate of effervescence. The effervescent composition may further comprise a pharmaceutically active compound. Effervescent pharmaceutical compositions are known in the art. See, e.g., U.S. Pat. No. 6,649,186, which is incorporated by reference in its entirety. The effervescent composition can be used in pharmaceutical, veterinary, horticultural, household, food, culinary, pesticidal, agricultural, cosmetic, herbicidal, industrial, cleansing, confectionery and flavoring applications. Formulations incorporating the effervescent composition comprising Reb C, or a stereoisomer thereof, can further include one or more additional adjuvants and/or active ingredients which can be chosen from those known in the art, including flavors, diluents, colors, binders, filler, surfactant, disintegrant, stabilizer, compaction vehicles, and non-effervescent disintegrants.

The pharmaceutical composition can be a film-shaped or wafer-shaped pharmaceutical composition. Such a film-shaped or wafer-shaped pharmaceutical composition can be configured, for example, as quickly disintegrating administration forms, e.g., administration forms disintegrating within a period of 1 second up to 3 minutes, or as slowly disintegrating administration forms, e.g., administration forms disintegrating within a period of 3 to 15 minutes. The indicated disintegration times can be set to the above-mentioned ranges by using, for example, matrix-forming polymers which have different disintegrating, or solubility, characteristics. Thus, by mixing the corresponding polymer components, the disintegration time can be adjusted. In addition, disintegrants are known which "draw" water into the matrix and cause the matrix to burst open from within. As a consequence, certain embodiments of the invention include such disintegrants for the purpose of adjusting the disintegration time.

Suitable are polymers for use in the film-shaped or wafer-shaped pharmaceutical composition include cellulose derivatives, polyvinyl alcohol (e.g. MOWIOL™), polyacrylates, polyvinyl pyrrolidone, cellulose ethers, such as ethyl cellulose, as well as polyvinyl alcohol, polyurethane, polymethacrylates, polymethyl methacrylates and derivatives and copolymerisates of the aforementioned polymers.

In certain embodiments, the total thickness of the film-shaped or wafer-shaped pharmaceutical composition according to the invention is preferably 5 µm up to 10 mm, preferably 30 µm to 2 mm, and with particular preference 0.1 mm to 1 mm. The pharmaceutical preparations may be round, oval, elliptic, triangular, quadrangular or polygonal shape, but they may also have any rounded shape.

In one embodiment, the pharmaceutical composition can be a gum base formulation comprising a medicament or agent contained, a carbohydrate sweetener and Reb C, or a stereoisomer thereof, in a coating that surrounds the gum base formulation. Preferably, the coating comprises at least 50% by weight of the entire product. As the center is chewed, the medicament or agent is released into the saliva. For example, U.S. Pat. No. 6,773,716, which is incorporated herein by reference in its entirety, discloses a suitable medicament or agent contained in a coating that surrounds a gum base formulation. It has been found that with respect to certain medicaments or agents that may have an astringent or bitter taste that by adding a sweet taste enhancing agent to the formulation, that a much more palatable formulation, including the medicament, can be provided. In this regard, even though the medicament in, for example, its powder form may be bitter or have an offensive taste, the matrix used as the coating of the present invention, including the enhancing agent, will afford a product having acceptable medicinal properties.

The pharmaceutical composition of the present invention can be in the form of an aerosol. The aerosol composition may further comprise pharmaceutically active agent. Aerosol compositions are known in the art. See, e.g., U.S. Pat. No. 5,011,678, which is hereby incorporated by reference in its entirety. As a nonlimiting example, an aerosol composition according to the present invention may comprise a medically effective amount of a pharmaceutically active substance, one or more carbohydrate sweeteners, Reb C, or a stereoisomer thereof, and a biocompatible propellant, such as a (hydro/fluoro)carbon propellant.

In one embodiment of the present invention, the pharmaceutical composition is a nutritional composition. Examples of nutritional compositions having an undesirable taste include, but are not necessarily limited to, enteral nutrition products for treatment of nutritional deficit, trauma, surgery, Crohn's disease, renal disease, hypertension, obesity and the like, to promote athletic performance, muscle enhancement or general well being or inborn errors of metabolism such as phenylketonuria. In particular, such nutritional formulations may contain one or more amino acids which have a bitter or metallic taste or aftertaste. Such amino acids include, but are not limited to, an essential amino acids selected from the group consisting of L isomers of leucine, isoleucine, histidine, lysine, methionine, phenylalanine, threonine, tryptophan, tyrosine, and valine.

In one embodiment, the sweet taste of the pharmaceutical composition or nutritional composition of the present invention is being enhanced by Reb C, or a stereoisomer thereof, by at least about 10%, 20%, 30%, 40%, 50%, 60%, 70%, 80%, 90%, or 95%, or from about 60% to about 99%, or alternatively from about 20% to about 50%.

In one embodiment, the consumable of the present invention is a dental hygienic composition, comprising a carbohydrate sweetener and Reb C, or a stereoisomer thereof, in an amount sufficient to enhance the sweet taste of the carbohydrate sweetener without exhibiting any off-taste. Dental hygienic compositions are known in the art and include, but are not necessarily limited to, toothpaste, mouthwash, plaque rinse, dental floss, dental pain relievers (such as ANBESOL™), and the like. In one embodiment, the dental hygienic composition comprises one carbohydrate sweetener. In another embodiment, the dental hygienic composition comprises more than one carbohydrate sweetener. In certain embodiments, the dental hygienic composition comprises sucrose and corn syrup, or it comprises sucrose and aspartame.

In another embodiment, the consumable of the present invention is a cosmetic product comprising a carbohydrate sweetener and Reb C, or a stereoisomer thereof. For example, but not by way of limitation, the cosmetic product can be a face cream, lipstick, lip gloss, and the like. Other suitable compositions of the invention include lip balm, such as CHAPSTICK® or BURT'S BEESWAX® Lip Balm, further comprising Reb C, or a stereoisomer thereof.

The present invention is also directed to various, useful consumables comprising Reb C, or stereoisomer thereof, described above.

In one embodiment, the present invention is directed to a food product comprising a carbohydrate sweetener and Reb C, or a stereoisomer thereof. Preferably, the food product is one which exhibits a sweet taste (i.e., inherently contains a carbohydrate sweetener) and/or to which a carbohydrate sweetener has been added. The food product comprises Reb C, or a stereoisomer thereof, in an amount sufficient to enhance the sweet taste without exhibiting an off-taste. Specific carbohydrate sweeteners have been described above. Specific food products in which an enhanced sweet taste is desired include, but are not limited to, cakes, cookies, confectionaries, such as candies, gums and chocolates, creams, icing, ice cream, pies and breads. Specific food products which are beverages include soft drinks, juices and other fruit drinks, sports drinks such as GATORADE®, coffee, teas, iced teas, cola, alcoholic beverages and KOOL-AID®.

In certain aspects, the present invention provides methods and compositions for enabling one to prepare consumable products, such as food and pharmaceutical products, which retain a desired sweetness but contain lower amounts of a carbohydrate sweetener, such as sugar, and in some cases fewer calories.

The following examples are illustrative, but not limiting, of the compounds, compositions, and methods of the present invention. Suitable modifications and adaptations of the variety of conditions and parameters normally encountered in clinical therapy and which are obvious to those skilled in the art in view of this disclosure are within the spirit and scope of the invention.

EXAMPLES

Example 1

The sweetness enhancing effect of 300 μM Reb C (Chromadex, Calif.; purity 94.9%; 2.9% impurities other than water) on 5% (w/v-%) sucrose solution was evaluated in a double-blind controlled test conducted according to the following protocol. Three products were evaluated by trained judges as follows:
high concentration sucrose (7% w/v)
low concentration sucrose (5% w/v)
low concentration sucrose+sweetness enhancer (test compound)

The products were evaluated using a sequential monadic test protocol. Subjects were given three samples to evaluate. Each subject was directed to swirl the first sample in his or her mouth for 3-5 seconds, expectorate the entire sample into a discard cup, and then assess the sweetness intensity of the sample. The intensity was rated on a score card by marking a numerical value along a scale from 0 to 8 (e.g., 0=none, 2=slight, 4=definite, 8=very strong). Following the decision regarding the sweetness intensity, subjects were instructed to rinse their mouth with water and spit in the discard cup. Subjects then were given unsalted crackers to cleanse the palate. A period of 10 minutes elapsed between presentations of each sample to reduce the potential influence of residual taste effects. A second sample was then presented and evaluated as above and the same procedure was followed until all three products were evaluated. Sample presentation was randomized to avoid order of presentation bias.

To participate in the sensory panel, judges or subjects were chosen from an expert taste panel. These subjects were screened for taste acuity and were trained in evaluating solutions using the sip and spit protocol and were trained in using a rating ballot. The number of judges who participated in the study was 20. The female subjects were all non-pregnant and all volunteers were of <55 years of age with no history of allergy to sucrose. Judges were asked to execute an informed consent form.

Specifically, the following instructions were given to the judges: Please take a sip of water. Carefully take the cap off the sample cup placed in front of you. Sip, swirl for 3-5 seconds, and then spit the sample into the cup provided, then assess the intensity of the sweetness of the sample. Please evaluate the sample for the intensity of the sweet flavor and put a vertical mark on the number that best describes the intensity. Rinse your mouth with the water provided and spit into the discard cup. Use crackers provided to cleanse your palate before evaluating the next sample.

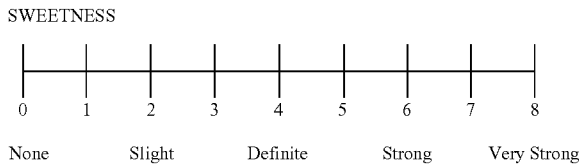

If any other flavor was present in the sample please describe it. Please rinse your mouth again several times and have some more water and unsalted crackers. You will now have a rest period of 10 minutes before you will be given the next sample.

Figure 1:
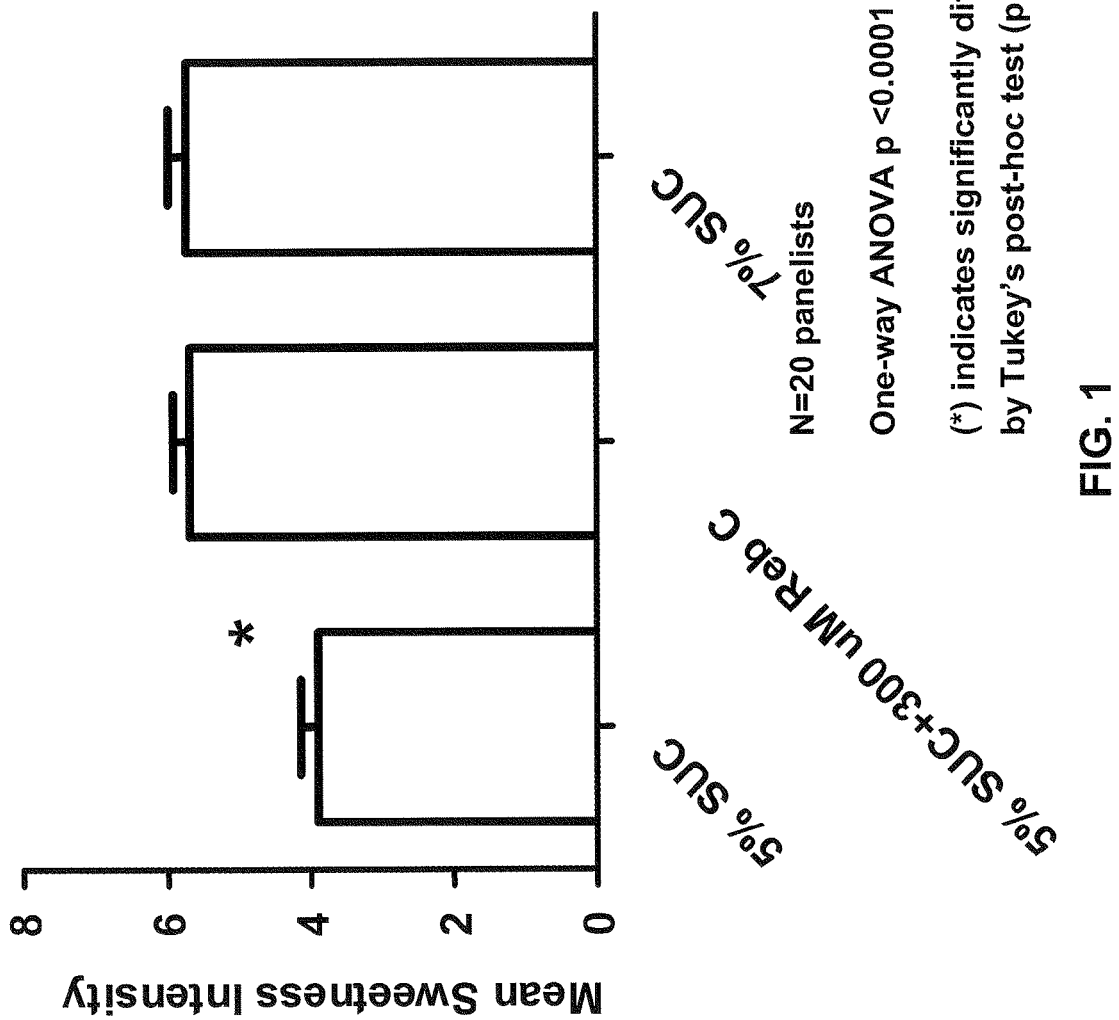
FIG. 1 depicts graphically the results of Example 1 illustrating the sweetness enhancing effect of 300 µM rebaudioside C on 5% (w/v-%) sucrose solution.

The results of this test are presented in FIG. 1. As can be seen from FIG. 1, the judges found that the sweetness of a solution of 5% (w/v-%) sucrose in combination with 300 μM of Reb C was indistinguishable from that of a 7% (w/v-%) sucrose solution. This is an effect that is equivalent to a standard industry goal for sweetness enhancement.

Example 2

Figure 2:
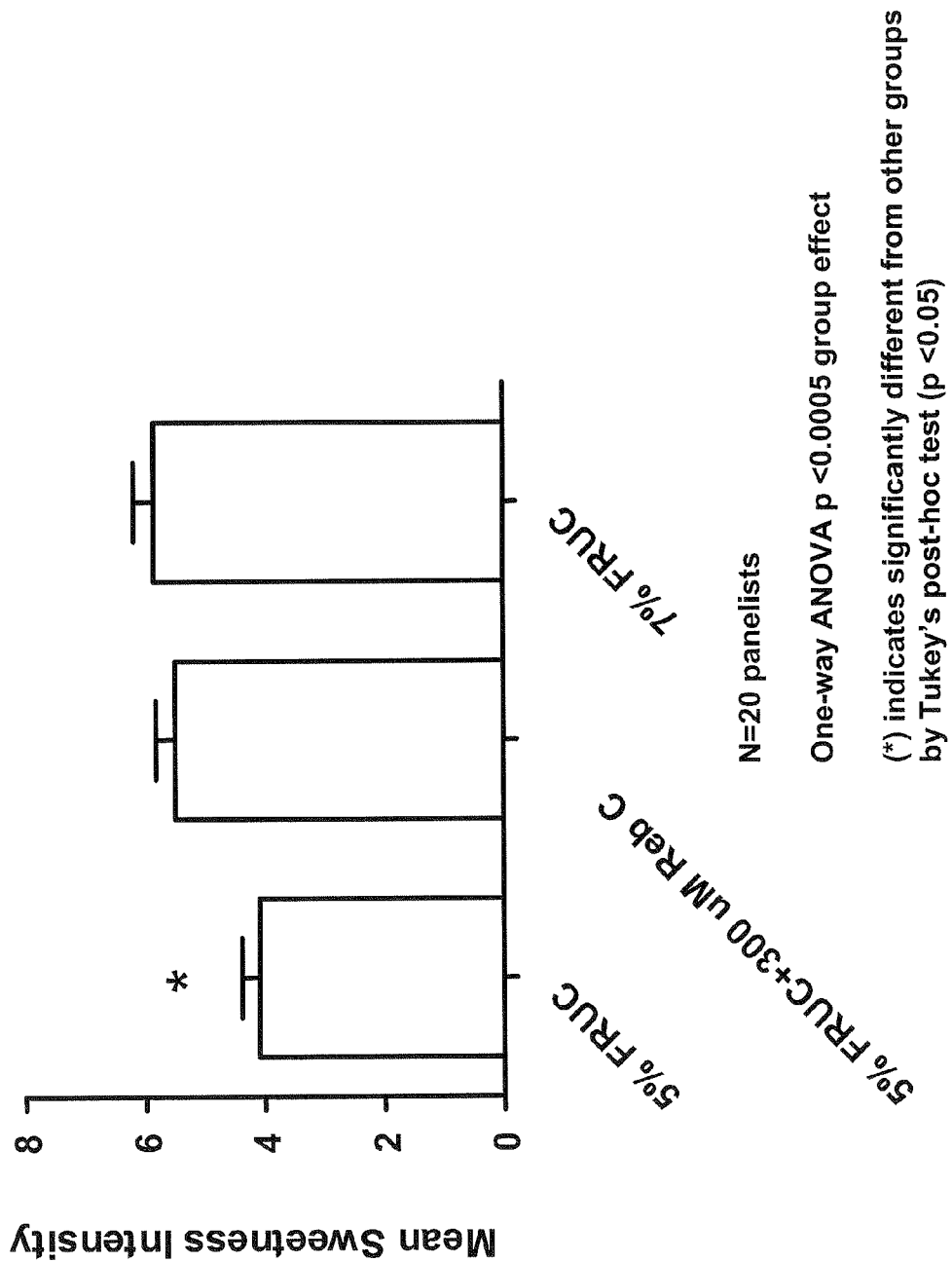
FIG. 2 depicts graphically the results of Example 2 illustrating the sweetness enhancing effect of 300 µM rebaudioside C on 5% (w/v-%) fructose solution.

The sweetness enhancing effect of 300 μM Reb C on 5% (w/v-%) fructose solution was evaluated in a double-blind controlled test as described in Example 1. The results of this test are presented in FIG. 2. As can be seen from FIG. 2, the judges found that the sweetness of a solution of 5% (w/v-%) fructose in combination with 300 μM of Reb C was close to that of a 7% (w/v-%) fructose solution.

Example 3

The taste of a 250 μM Reb C solution was evaluated by a test group having five (5) subjects as follows (Forced-choice): Subjects were presented with 2 cups, each containing 10 ml of either 250 μM Reb C water solution or water (room temperature). The contents of the samples were not revealed to the subjects until after the test. Subjects were asked to sip most or all of the 10 ml from the first cup, swish the liquid in their oral cavity, and expectorate into a cup, then rinse their mouths vigorously with water. Soon thereafter, the contents of the second cup were sampled in the same manner. Then, subjects were asked to choose the sweeter of the two samples, or if not sweet, to describe the qualitative taste profile of the sample having a detectable taste. All subjects correctly identified the sample containing Reb C and gave the following qualitative taste descriptions:

| | |
|---|---|
| Subject 1: | Metallic, not sweet; |
| Subject 2: | Aversive ("Nasty"); |
| Subject 3: | Slight sweet, astringent; |
| Subject 4: | Faintly sweet; and |
| Subject 5: | Slight sweet/licorice. |

The taste of 250 μM and 300 μM Reb C solutions were evaluated as follows by another test group having four (4) subjects as follows: 10 ml solutions of 250 and 300 μM Reb C in water were sampled by four subjects who were asked to report their qualitative taste experience of the solutions. Subjects were aware of the sample contents but had no previous exposure to Reb C nor were they given any verbal suggestion about expected tastes that could influence their report. The subjects have the following qualitative taste descriptions:

Subject 1: Both concentrations bitter and/or licorice;
Subject 2: Both concentrations bitter and/or licorice;
Subject 3: Both concentrations bitter and/or licorice; and
Subject 4: Both concentrations bitter and/or licorice.

Example 4

Figure 3:
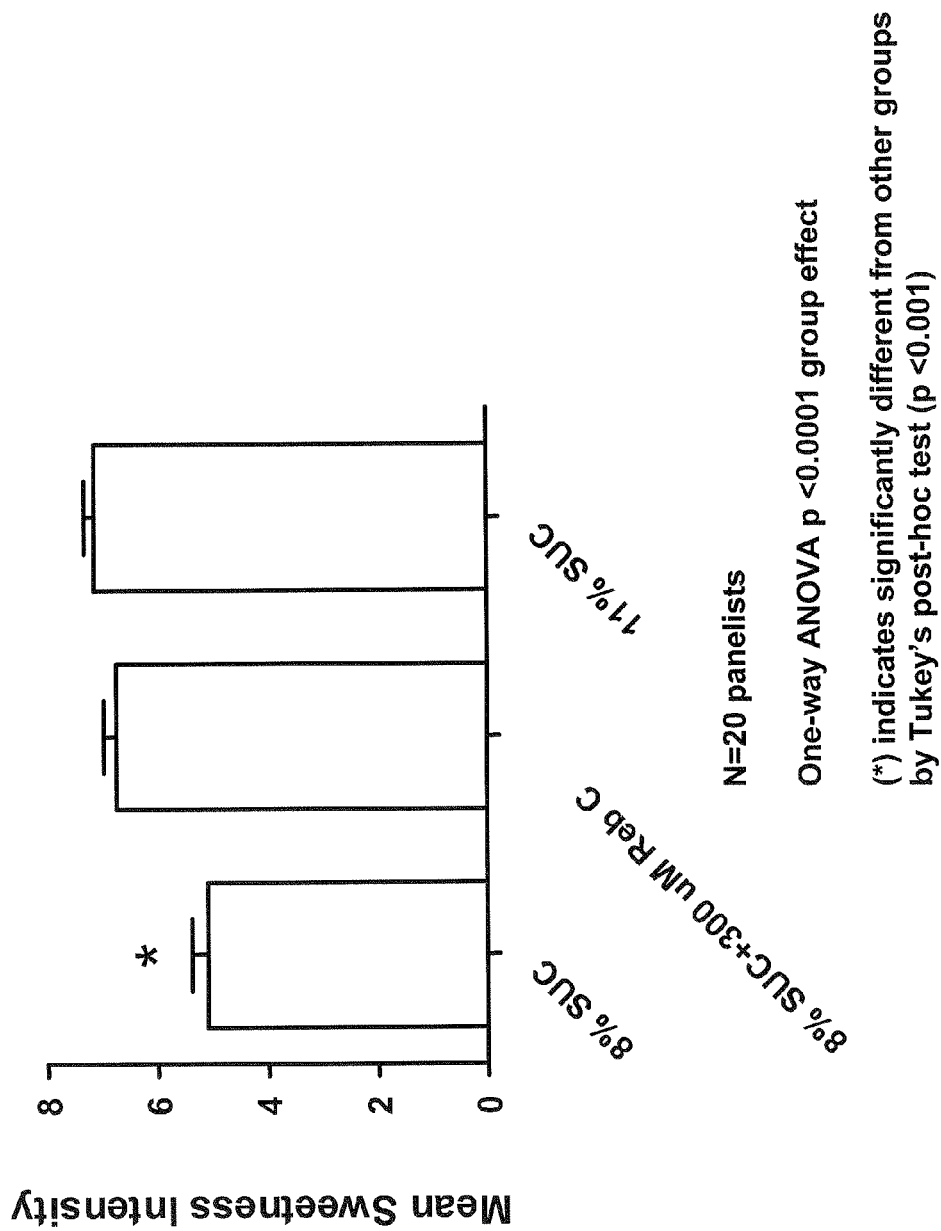
FIG. 3 depicts graphically the results of Example 4 illustrating the sweetness enhancing effect of 300 µM rebaudioside C on 8% (w/v-%) sucrose solution.

The sweetness enhancing effect of 300 μM Reb C on 8% (w/v-%) sucrose solution was evaluated in a double-blind controlled test according to the procedure described in Example 1. The results of this test are presented in FIG. 3. As can be seen from FIG. 3, the judges found that the sweetness of a solution of 8% (w/v-%) sucrose in combination with 300 μM of Reb C was close to that of an 11% (w/v-%) sucrose solution.

Example 5

Figure 4:
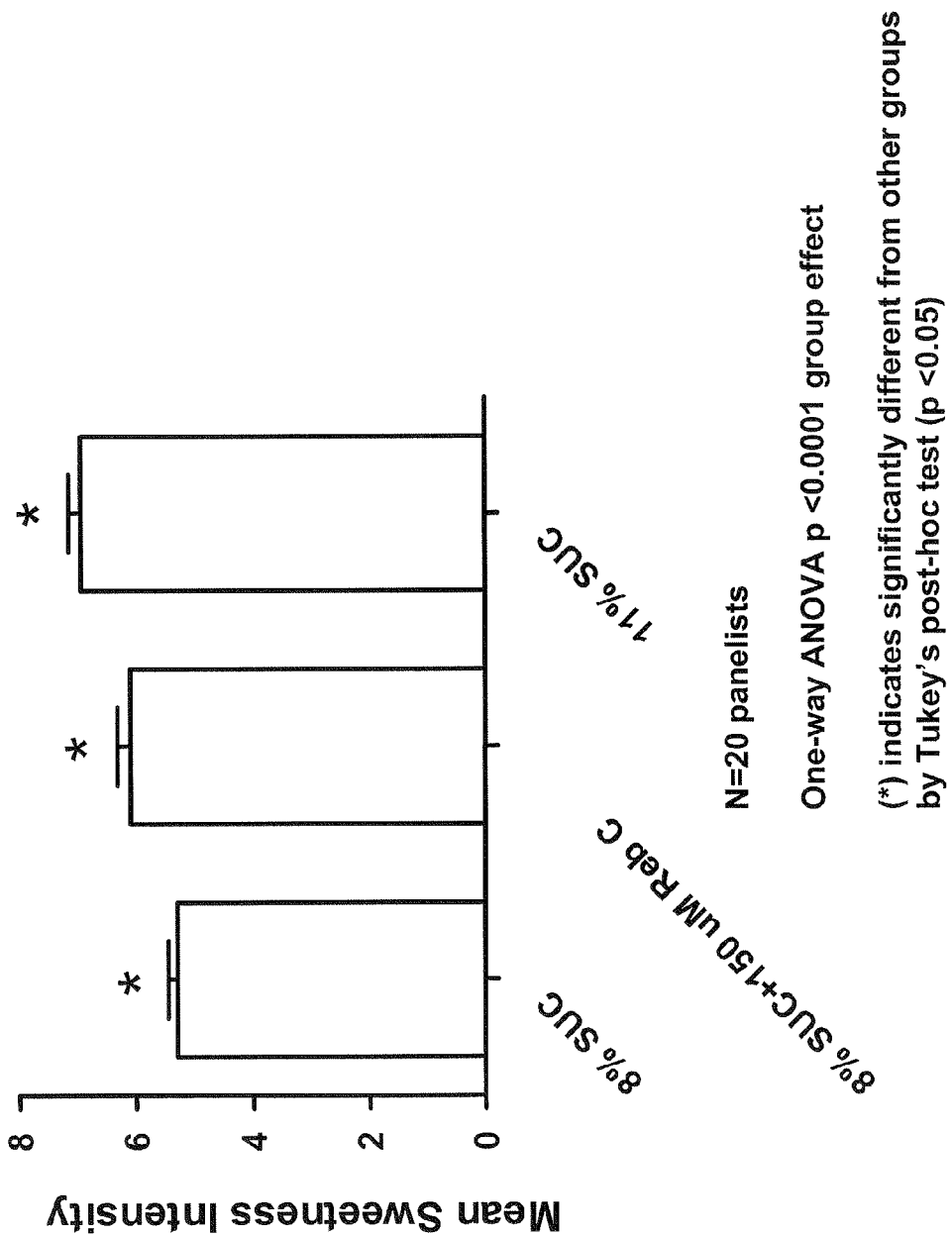
FIG. 4 depicts graphically the results of Example 5 illustrating the sweetness enhancing effect of 150 µM rebaudioside C on 8% (w/v-%) sucrose solution.

The sweetness enhancing effect of 150 μM Reb C on 8% (w/v-%) sucrose solution was evaluated in a double-blind controlled test according to the procedure described in Example 1. The results of this test are presented in FIG. 4. As can be seen from FIG. 4, the judges found that the sweetness of a solution of 8% (w/v-%) sucrose in combination with 150 μM of Reb C was between that of the 8% (w/v-%) sucrose solution and that of an 11% (w/v-%) sucrose solution. The mean sweetness intensity scores of this test for 8% (w/v-%) sucrose solution, 8% (w/v-%) sucrose solution with 150 μM Reb C, and 11% (w/v-%) sucrose solution were 5.30, 6.10. and 6.95, respectively.

Example 6

The sweetness enhancing effect of 300 μM Reb C (Chromadex, Calif.; purity 94.9%; 2.9% impurities other than water) in iced tea having 10.39% (w/v-%) high fructose corn syrup (HFCS55, Tate & Lyle) (equivalent to the sweetness intensity of an 8% (w/v-%) sucrose solution) was evaluated in a double-blind controlled test conducted according to the following protocol. Three products were evaluated by trained judges as follows:
- high concentration HFCS55 (14.29% w/v; equivalent to 11% w/v sucrose solution)
- low concentration HFCS55 (10.39% w/v; equivalent to 8% w/v sucrose solution)
- low concentration HFCS55+ sweetness enhancer (test compound)

The products were evaluated using a sequential monadic test protocol. Subjects were given three 10 ml samples to evaluate. Each subject was directed to taste and swallow each sample and then assess the sweetness intensity of the sample. The intensity was rated on a score card by marking a numerical value along a scale from 0 to 8 (e.g., 0=none, 2=slight, 4=definite, 8=very strong). Following the decision regarding the sweetness intensity, subjects were instructed to vigorously rinse their mouth with water. Subjects then were given unsalted crackers to cleanse the palate. A period of 10 minutes elapsed between presentations of each sample to reduce the potential influence of residual taste effects. A second sample was then presented and evaluated as above and the same procedure was followed until all three products were evaluated. Sample presentation was randomized to avoid order of presentation bias.

To participate in the sensory panel, judges or subjects were chosen from an expert taste panel. These subjects were screened for taste acuity and were trained in evaluating solutions using the sip and spit protocol and were trained in using a rating ballot. The number of judges who participated in the study was 20. The female subjects were all non-pregnant and all volunteers were of <55 years of age with no history of allergy to sucrose. Judges were asked to execute an informed consent form.

Specifically, the following instructions were given to the judges: Please take a sip of water. Carefully take the cap off the sample cup placed in front of you. Sip and swallow the sample, then assess the intensity of the sweetness of the sample. Please evaluate the sample for the intensity of the sweet flavor and put a vertical mark on the number that best describes the intensity. Rinse your mouth with the water provided and spit into the discard cup. Use crackers provided to cleanse your palate before evaluating the next sample.

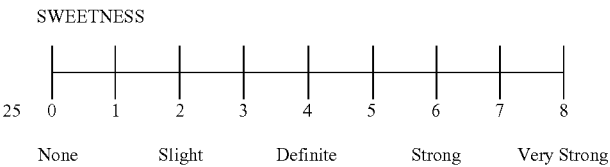

If any other flavor was present in the sample please describe it. Please rinse your mouth again several times and have some more water and unsalted crackers. You will now have a rest period of 10 minutes before you will be given the next sample.

Figure 5:
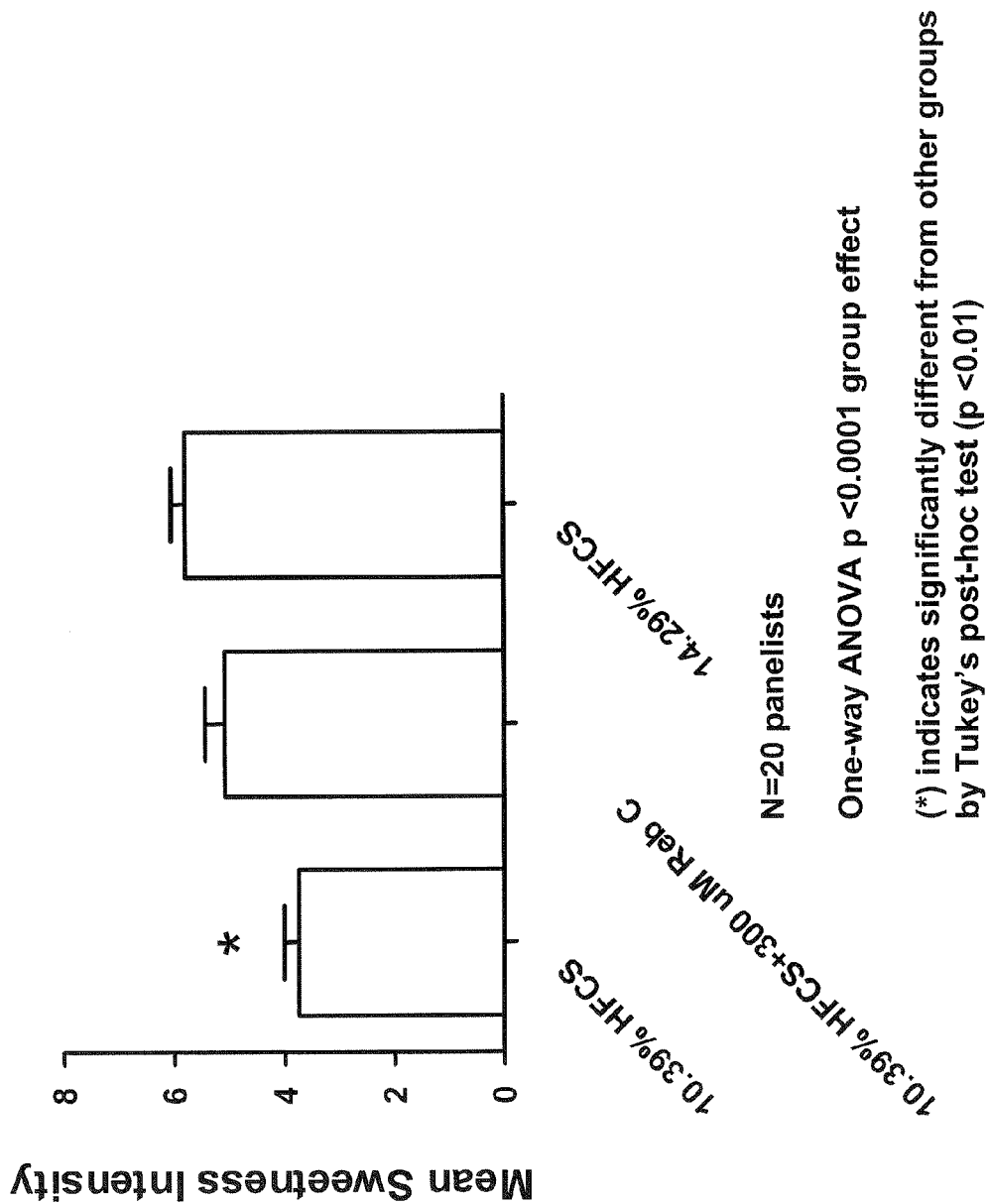
FIG. 5 depicts graphically the results of Example 6 illustrating the sweetness enhancing effect of 300 µM rebaudioside C in iced tea containing 10.39% (w/v-%) high fructose corn syrup (HFCS).

The results of this test are presented in FIG. 5. As can be seen from FIG. 5, the judges found that the sweetness of a solution of 10.39% (w/v-%) HFCS55 (HFCS) in combination with 300 μM of Reb C was indistinguishable from that of a 14.29% (w/v-%) HFCS55 (HFCS) solution (equivalent to the sweetness intensity of an 11% (w/v-%) sucrose solution). This is an effect that is equivalent to a standard industry goal for sweetness enhancement.

Example 7

Figure 6:
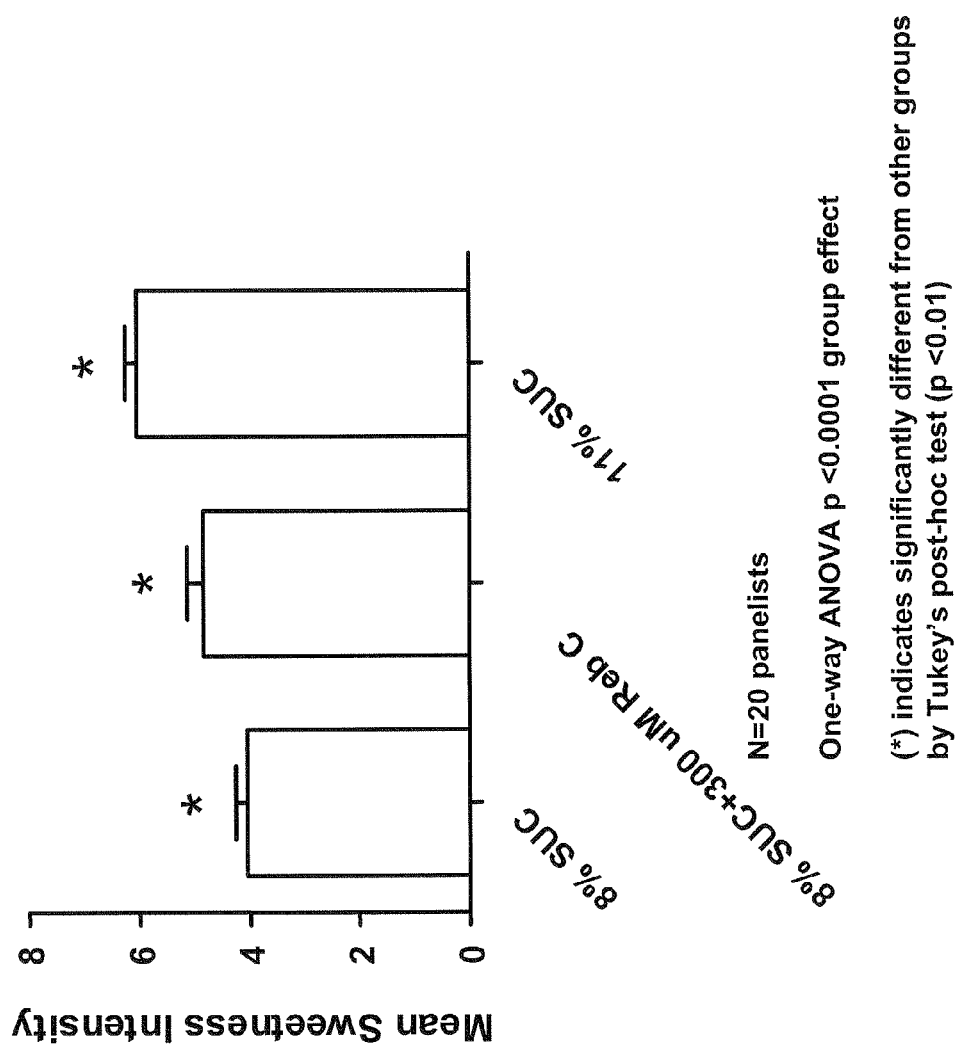
FIG. 6 depicts graphically the results of Example 7 illustrating the sweetness enhancing effect of 300 µM rebaudioside C in iced tea containing 8% (w/v-%) sucrose.

The sweetness enhancing effect of 300 μM Reb C in iced tea having 8% (w/v-%) sucrose was evaluated in a double-blind controlled test as described in Example 6. The results of this test are presented in FIG. 6. As can be seen from FIG. 6, the judges found that the sweetness of a solution of 8% (w/v-%) sucrose in combination with 300 μM Reb C was between that of the 8% (w/v-%) sucrose solution and that of an 11% (w/v-%) sucrose solution.

Example 8

Figure 7:
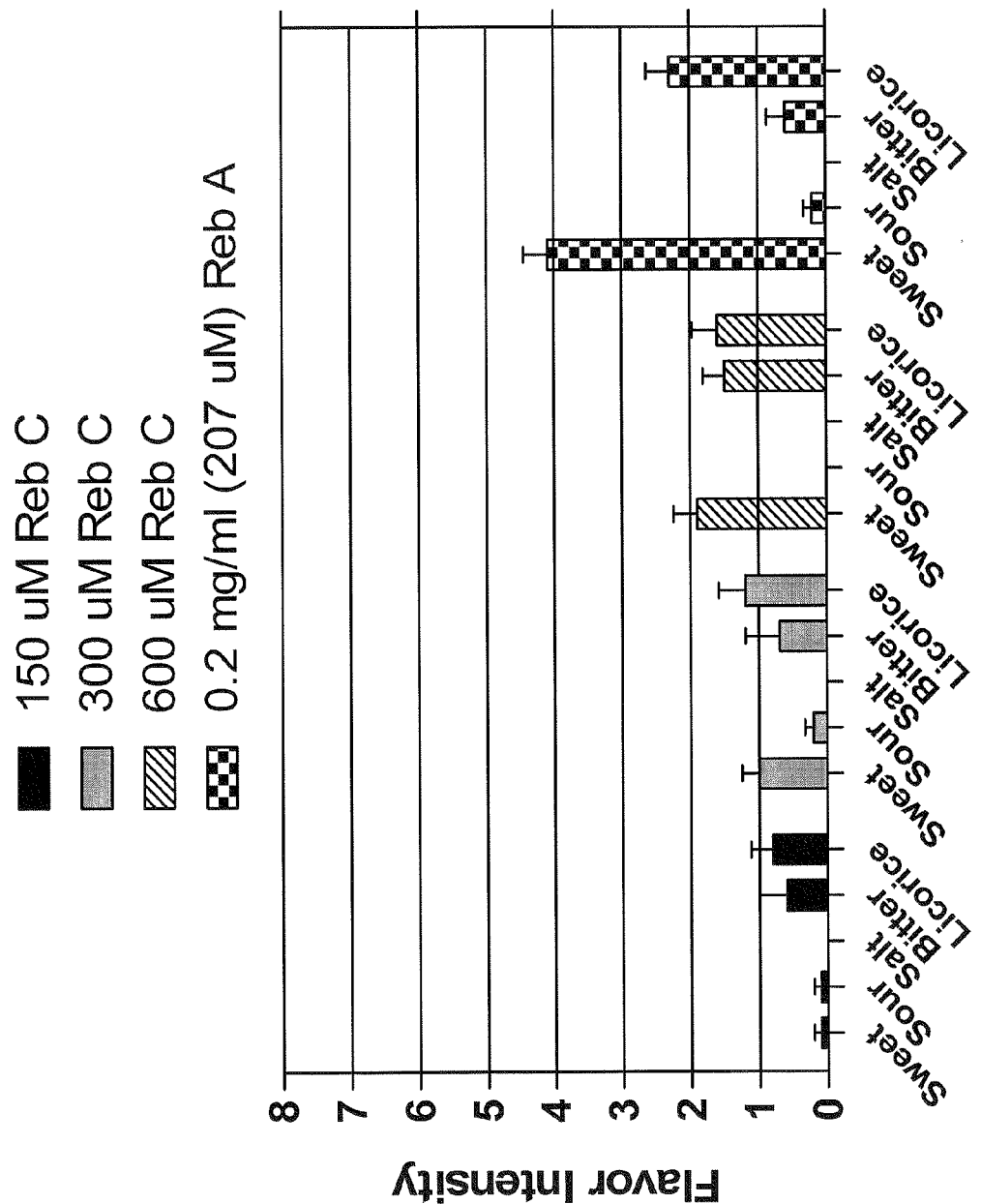
FIG. 7 depicts graphically the results of Example 8 illustrating the taste profiles of 150, 300, and 600 µM rebaudioside C solution and 0.2 mg/ml rebaudioside A solution.

The taste of 150, 300, and 600 μM Reb C was evaluated by a test group. 10 panelists were trained over a period of a few weeks to provide a quantitative flavor profile of Reb C. Panelists first were trained using standard tastants representing the different taste modalities given in FIG. 7 (i.e., sweet, bitter, salt, sour, and licorice). They then were trained to use the scales when flavors were mixed together. All intensity ratings are on scales ranging from 0 (no taste) to 8 (highest intensity). The intensity rating for sweet is essentially the same as used in Examples 1 and 6. The taste profiles were obtained for 150, 300, and 600 μM Reb C. Reb A (0.2 mg/ml, a concentration used in some food/beverage applications for sweetening) was also evaluated in the test for comparison. The scale is not linear at the bottom. A rating of 1 is around the threshold for sweetness detection. As can be seen from FIG. 7, Reb C has little or no intrinsic sweetness at the concentrations tested. Also, the unpleasant tastes, bitter and licorice, that also are barely detected, have been undetected when Reb C was combined with sugar.

Example 9

The sweetness enhancing effect of 285 ppm (300 μM) Reb C on erythritol water solution having a sweetness intensity equivalent to a 5% (w/v-%) sucrose solution (erythritol concentration 7.14% w/v; 580 μM) was evaluated in a double-blind controlled test according to the procedure described in Example 6. Three products were evaluated by trained judges as follows:
- high concentration erythritol (10% w/v) (sweetness intensity equivalent to 7% (w/v-%) sucrose)
- low concentration erythritol (7.14% w/v) (sweetness intensity equivalent to 5% (w/v-%) sucrose)
- low concentration erythritol+sweetness enhancer (285 ppm Reb C).

The results of this test are presented in FIG. 9. As can be seen from FIG. 9, the judges found that the sweetness of a 7.14% erythritol solution having a sweetness intensity equivalent to a 5% (w/v-%) sucrose solution in combination with 285 ppm Reb C was significantly sweeter than the 7.14% erythritol solution alone, but did not achieve the sweetness of a 10% erythritol solution having a sweetness intensity equivalent to 7% (w/v-%) sucrose solution.

Example 10

The sweetness enhancing effect of 190 ppm Reb C in a cola beverage sweetened with 10.39% (w/v-%) high fructose corn syrup 55 (HFCS55) (equivalent to the sweetness intensity of an 8% (w/v-%) sucrose solution) and buffered with citric acid was evaluated in a double-blind controlled test according to the procedure described in Example 6.

Three products were evaluated by trained judges as follows:
- high concentration HFCS55 (14.29% w/v; sweetness intensity equivalent to 11% w/v sucrose solution)
- low concentration HFCS55 (10.39% w/v; sweetness intensity equivalent to 8% w/v sucrose solution)
- low concentration HFCS55+ sweetness enhancer (190 ppm Reb C).

The formulation for 50 ml of cola beverage syrup was as follows:
- 31.17 g HFCS, Isosweet 5500 (Tate & Lyle) (provides 10.39% w/v in 300 ml of finished cola beverage);
- 0.625 g natural flavor extract, cola type, NV 12-713 (Robertet);
- 0.125 g citric acid;
- 0.175 g caramel color, DS 400 (Sethness); and
- water QS to 50 ml.

The corresponding cola beverage syrup that would provide 14.29% (w/v-%) HFCS55, contained 42.87 g of HFCS55.

The cola beverage was prepared using Canada Dry seltzer as follows: 5 parts seltzer+1 part cola beverage syrup. The pH of the final cola beverage was 2.7-2.8. The amount of citric acid in the final cola beverage was 0.04%. The cola beverage was served to judges at 45° F.

The results of this test are presented in FIG. 10. As can be seen from FIG. 10, 190 ppm Reb C in combination with 10.39% (w/v-%) HFCS55 (sweetness intensity equivalent to an 8% w/v sucrose solution) significantly increases the sweetness intensity to that of 14.29% HFCS55 (sweetness intensity equivalent to a 11% w/v sucrose solution).

A control group of four products containing unsweetened cola beverage (group a) and unsweetened cola beverage in combination with 95 ppm Reb C (group b), 190 ppm Reb C (group c) and 285 ppm Reb C (group d) were tested similarly. The results of this test are presented in FIG. 11. FIG. 11 shows that Reb C does not increase the sweetness of an unsweetened cola beverage at the concentrations 190 ppm or below (i.e., no intrinsic sweetness is detected at 190 ppm Reb C in the unsweetened cola beverage).

Example 11

The sweetness enhancing effect of 190 ppm Reb C in lemon-lime soda sweetened with 10.39% (w/v-%) high fructose corn syrup 55 (HFCS55) (equivalent to the sweetness intensity of an 8% (w/v-%) sucrose solution) was evaluated in a double-blind controlled test according to the procedure described in Example 6.

Three products were evaluated by trained judges as follows:
- high concentration HFCS55 (14.29% w/v; sweetness intensity equivalent to 11% w/v sucrose solution)
- low concentration HFCS55 (10.39% w/v; sweetness intensity equivalent to 8% w/v sucrose solution)
- low concentration HFCS55+ sweetness enhancer (190 ppm Reb C).

The formulation for 50 ml of lemon-lime syrup was as follows:
- 31.17 g HFCS, Isosweet 5500 (Tate & Lyle) (provides 10.39% w/v in 300 ml of finished lemon-lime soda);
- 0.45 g natural lemon lime flavor extract, NV 20-036 (Robertet);
- 0.38 g citric acid; and
- water QS to 50 ml.

The lemon-lime syrup that would provide 14.29% (w/v-%) HFCS55, contained 42.87 g of HFCS55.

The lemon-lime soda was prepared using Canada Dry seltzer as follows: 5 parts seltzer+1 part lemon-lime syrup, i.e., 250 ml seltzer+50 ml lemon-lime syrup. The amount of citric acid in the final beverage was 0.15% and the pH was 2.6-2.7. The lemon-lime soda was served to judges at 45° F.

The results of this test are presented in FIG. 12. As can be seen from FIG. 12, the judges found that 190 ppm Reb C in combination with 10.39% (w/v-%) HFCS55 (sweetness intensity equivalent to 8% w/v sucrose solution) did not reach the sweetness of a 14.29% (w/v-%) HFCS55 solution (sweetness intensity equivalent to a 11% w/v sucrose solution).

A control group of four products containing unsweetened lemon-lime soda (group a) and unsweetened lemon-lime soda in combination with 95 ppm Reb C (group b), 190 ppm Reb C (group c) and 285 ppm Reb C (group d) were tested similarly. The results of this test are presented in FIG. 11. FIG. 11 shows that Reb C does not increase the sweetness of an unsweetened cola beverage at the concentrations 190 ppm or below (i.e., no intrinsic sweetness is detected at 190 ppm Reb C in the unsweetened cola beverage).

Example 12

The sweetness enhancing effect of 190 ppm and 310 ppm Reb C in a cola beverage sweetened with 10.39% (w/v-%) high fructose corn syrup 55 (HFCS55) (equivalent to the sweetness intensity of an 8% (w/v-%) sucrose solution) and buffered with phosphoric acid was evaluated in a double-blind controlled test according to the procedure described in Example 10. The cola beverage was prepared as described in Example 10 except that 0.125 g of phosphoric acid (85%, Innophos)) was used in the cola beverage syrup instead of citric acid. The amount of phosphoric acid in the final cola beverage was 0.04% and the pH was 2.7-2.8.

The results of this test are presented in FIG. 14 and FIG. 15. As can be seen from FIG. 14, the judges found that 190 ppm Reb C in combination with 10.39% (w/v-%) HFCS55 (sweetness intensity equivalent to 8% w/v sucrose solution) in a cola beverage buffered with phosphoric acid instead of citric acid is not higher than that of 10.39% (w/v-%) HFCS55 cola beverage alone (10.39% HFCS55).

However, as can be seen in FIG. 15, the judges found that 310 ppm Reb C increased significantly the sweetness intensity of a cola beverage containing 10.39% (w/v-%) HFCS55, but did not reach the sweetness of a 14.29% (w/v-%) HFCS55 cola beverage (sweetness intensity equivalent to a 11% w/v sucrose solution).

Example 13

The sweetness enhancing effect of 300 µM Reb C in a 8% (w/v-%) fructose solution was evaluated in a double-blind controlled test as described in Example 6. The results of this test are presented in FIG. 16. As can be seen from FIG. 16, the judges found that the sweetness of a solution of 8% (w/v-%) fructose in combination with 300 µM Reb C was between that of the 8% (w/v-%) fructose solution and that of an 11% (w/v-%) fructose solution. However, the effect of 300 µM Reb C was not statistically significant.

Example 14

A low-calorie yoghurt can be prepared as follows. In 5 kg of defatted milk, 300 ppm of Reb C and 100000 ppm of sucrose, is dissolved. After pasteurizing at 82° C. for 20 minutes, the milk is cooled to 40° C. A starter in amount of 150 grams is added and the mixture is incubated at 37° C. for 6 hours. The fermented mass is then maintained at 10-15° C. for 12 hours.

Example 15

A low-calorie orange juice drink can be prepared as follows. Orange concentrate (35%), citric acid (0.38%), ascorbic acid (0.05%), sodium benzoate (0.02%), orange red color (0.01%), orange flavor (0.20%), 300 ppm of Reb C, and optionally 20000-100000 ppm of sucrose are blended and dissolved completely in the water (up to 100%) and pasteurized.

Having now fully described this invention, it will be understood by those of ordinary skill in the art that the same can be performed within a wide and equivalent range of conditions, formulations and other parameters without affecting the scope of the invention or any embodiment thereof. All patents, published patent applications, and publications cited herein are fully incorporated by reference herein in their entirety.

What is claimed is:

1. A method of enhancing a sweet taste of a carbohydrate sweetener, comprising administering to a subject the carbohydrate sweetener and rebaudioside C, or a stereoisomer thereof, wherein the rebaudioside C, or a stereoisomer thereof, is present at a concentration of from about 310 ppm to about 600 ppm, or about 320 µM to about 600 µM, an amount effective to provide the sweet taste enhancing effect without exhibiting an off-taste characterized as a bitter taste, a licorice-like taste, a metallic taste, an aversive taste, a nasty taste, an astringent taste, a delayed sweetness onset, or a lingering sweet aftertaste.

2. The method of claim 1, wherein the carbohydrate sweetener is sucrose, fructose, glucose, high fructose corn syrup, xylose, arabinose, rhamnose, erythritol, xylitol, mannitol, sorbitol, or inositol.

3. The method of claim 1, wherein the carbohydrate sweetener and rebaudioside C, or a stereoisomer thereof, are administered in a consumable.

4. The method of claim 3, wherein the consumable is a food product, a pharmaceutical composition, a dietary supplement, a nutraceutical, a dental hygiene composition or a cosmetic product.

5. The method of claim 3, wherein the consumable has a sweetness intensity equivalent to about 5-12% (w/v-%) sucrose solution.

6. The method of claim 1, wherein the carbohydrate sweetener is present at a concentration of from about 20000 ppm to about 100000 ppm.

* * * * *